Dec. 13, 1960 A. G. SNYDER ET AL 2,964,108

RECORD PERFORATOR

Filed Oct. 11, 1957 10 Sheets-Sheet 1

INVENTORS
ALTON G. SNYDER
HARRY L. LAMBERT
PAUL F. PAGE
BY Thomas S. Ross
Joseph R. Spalla
ATTORNEYS Dec. 13, 1960 A. G. SNYDER ET AL 2,964,108

RECORD PERFORATOR

Filed Oct. 11, 1957 10 Sheets-Sheet 2

INVENTORS
ALTON G. SNYDER
HARRY L. LAMBERT
PAUL F. PAGE
BY Thomas S. Ross
Joseph R. Spalla
ATTORNEYS Dec. 13, 1960 A. G. SNYDER ET AL 2,964,108

RECORD PERFORATOR

Filed Oct. 11, 1957 10 Sheets-Sheet 3

INVENTORS
ALTON G. SNYDER
HARRY L. LAMBERT
PAUL F. PAGE
BY Thomas S. Ross
Joseph R. Spalla
ATTORNEYS Dec. 13, 1960 A. G. SNYDER ET AL 2,964,108

RECORD PERFORATOR

Filed Oct. 11, 1957 10 Sheets-Sheet 4

INVENTORS
ALTON G. SNYDER
HARRY L. LAMBERT
PAUL F. PAGE
BY Thomas S. Ross
Joseph R. Spalla
ATTORNEYS INVENTORS
ALTON G. SNYDER
HARRY L. LAMBERT
PAUL F. PAGE
BY Thomas S. Ross
Joseph R. Spalla
ATTORNEYS

RECORD PERFORATOR

Filed Oct. 11, 1957 10 Sheets-Sheet 6

INVENTORS
ALTON G. SNYDER
HARRY L. LAMBERT
PAUL F. PAGE
BY Thomas S. Rose
Joseph R. Spalla
ATTORNEYS Dec. 13, 1960 A. G. SNYDER ET AL 2,964,108

RECORD PERFORATOR

Filed Oct. 11, 1957 10 Sheets-Sheet 7

INVENTORS
ALTON G. SNYDER
HARRY L. LAMBERT
PAUL F. PAGE
BY Thomas S. Ross
Joseph R. Spalla
ATTORNEYS INVENTORS
ALTON G. SNYDER
HARRY L. LAMBERT
PAUL F. PAGE
BY Thomas S. Ross
Joseph R. Spalla
ATTORNEYS INVENTORS
ALTON G. SNYDER
HARRY L. LAMBERT
PAUL F. PAGE
BY Thomas S. Ross
Joseph R. Spalla
ATTORNEYS Dec. 13, 1960 A. G. SNYDER ET AL 2,964,108

RECORD PERFORATOR

Filed Oct. 11, 1957 10 Sheets-Sheet 10

INVENTORS
ALTON G. SNYDER
HARRY L. LAMBERT
PAUL F. PAGE
BY Thomas S. Ross
Joseph R. Spalla
ATTORNEYS United States Patent Office 2,964,108

Patented Dec. 13, 1960

2,964,108

RECORD PERFORATOR

Alton G. Snyder, Newington, Harry L. Lambert, West Hartford, and Paul F. Page, Newington, Conn., assignors to Royal McBee Corporation, Port Chester, N.Y., a corporation of New York Filed Oct. 11, 1957, Ser. No. 689,587

11 Claims. (Cl. 197—1.6)

This invention relates to a record perforator which is automatically controlled by pneumatics responsive to motions associated with the operation of a business machine; more particularly it relates to a pneumatically controlled record perforator incorporating pneumatic circuitry for so controlling pneumatics responsive to motions associated with a business machine as to enable functions other than character and numeral functions to be automatically punched in a record without interruption in the operation of the business machine and at normal business machine operating speeds; and specifically it relates to a perforating mechanism having pneumatic means selectively actuated in accordance with a desired coding arrangement for effecting the selection of punches and for simultaneously coupling a motive source to means for driving a record to be perforated and to means for driving selected punches through the record to be perforated.

Mechanism embodying the invention is adapted for use generally in connection with data processing or like machines of various kinds, but has special utility when incorporated with electric typewriters wherein information may be typed and simultaneously translated into data processing machine language in the form of 5, 6, 7 or 8 level communication coded punched paper tapes.

Perforated records presently employed to pneumatically operate printing machines automatically are of the music roll type. Character, punctuation, numeral data, and machine function controls are punched in columns transverse to the direction of movement of the records; each column having only a single perforation representing a character or control which is located along the transverse column; different character perforations being at different predetermined distances from the edge of the record roll. This, of course, necessitates a very wide roll to accommodate all the characters, numerals and controls such as carriage return, tabulation, shift, etc. Additionally the length of the roll is unnecessarily long for a given record since a number of spaces after a carriage return or tabulator perforation are necessary to allow sufficient time during readout of the record for movement of the carriage. These music roll records are punched with a standard manually operated typewriter wherein the punches are directly connected to the type key levers. Advancement of the music roll record is accomplished by pneumatics comprising a bellows controlled pawl in combination with a ratchet; the bellows being actuated by a pneumatic impulse valve associated with the key levers. When it is time for a carriage return, the carriage is manually returned and a carriage return perforation put in the recod manually; the operator then spacing the record a number of spaces to allow sufficient time for the carriage to be returned during readout of the roll.

As is apparent a plurality of punches equivalent in number to the number of character, numeral, and control functions is required necessitating a multiplication of parts and proportionate housing space requirements.

Additionally when an operator realizes he has made an error, the hole punched has to be covered as by tape and the correct character repunched. If the error goes undiscovered, which is very likely since the information is not simultaneously typed, a faulty record results; or is discovered too late, the only practical method of correction is to repunch the whole record.

The task then of perforating a music roll record is very time consuming as compared to the time required to perforate tapes in conventional communication codes wherein the space between each column of perforations is constant.

The instant invention overcomes the disadvantages attendant to music roll perforated records and the punching means employed to perforate them by providing a pneumatically controlled punching mechanism adapted to perforate a paper tape in a conventional communication code and at normal business machine operating speeds. In accordance with the invention operation of a typewriter or like printing machine not only prints in a conventional manner but simultaneously through output mechanisms associated with the typewriter converts motions associated with typing into pneumatic control and combinations of impulses representative of typed data, the combinations being in accordance with a desired code. The data impulses selectively control pneumatically responsive actuators operable to select punches and to simultaneously couple means for powering said selected punches and a tape feed mechanism to a drive source.

In accordance with the invention pneumatic circuitry responsive to the control impulses is adapted to so control the pneumatically responsive actuators that machine control functions such as carriage return and tabulation may be automatically punched in the tape without interruption in typing and without the necessity for spacing the record. During a carriage return for example, striking the carriage return key initiates a group of impulses representative of a carriage return for selectively controlling the pneumatically responsive actuators whereby a carriage return code is punched, and also initiates a control pulse for activating the pneumatic circuitry. The pneumatic circuitry is operable to disable the pneumatically responsive actuators immediately after the carriage return code has been punched and for a time sufficient for return movement of the carriage.

Errors, which may be discovered from the simultaneously printed record are corrected by initiating a correction impulse through a pneumatic control at the perforating station which conditions the pneumatic circuitry and disables the pneumatically responsive actuators to prevent the selection of punches and then by pressing the back space key on the typewriter whereupon an impulse is sent to said pneumatic circuitry conditioned by the correction impulse, which operates a pneumatically responsive back space mechanism. Thereafter upon termination of said correction impulse delete impulses initiated by delete key action control the pneumatically responsive actuators which cause a blank code to be punched thereby obliterating the character in error and following characters on the tape if necessary. Thereafter typing may be immediately resumed.

Broadly the record perforator comprises a motive source, a punch powering means, a tape drive means, a plurality of punches, and pneumatically operable mechanism responsive to pneumatic impulses representative of data, adapted to simultaneously couple the motive source to the punch powering means and the tape drive, whereby selected punches are powered in and out of the tape in synchronism with the motion of the tape past the punches; the tape drive being such that the tape is momentarily stopped during the interval the punches are perforating the tape.

An object of the invention therefore is the provision of a record perforator which is automatically controlled.

Another object of the invention is to provide an automatic pneumatically controlled punch and tape feed mechanism adapted to perforate narrow tapes in accordance with a desired coding arrangement.

A further object of the invention is the provision of a pneumatically operated remotely controlled record perforator which enables records to be automatically perforated at normal business machine operating speeds.

A further object of the invention is the provision of a pneumatic record perforator whereby all the control functions of a business machine along with characters, punctuation, and numerals are automatically punched in the record without interruption in the operation of the business machine.

A still further object of the invention is to provide a pneumatically operable record perforating system adapted to automatically encode and punch every business machine function in narrow tapes in conventional communication sized and spaced codes representative of said functions.

Another object of the invention is the provision of a pneumatically operated record perforator adapted to automatically encode and punch narrow tape records that are compatible with any reader adapted to read out communication sized and spaced codes.

Still another object of the invention is to provide a record perforator construction which enables records to be simultaneously typed and encoded in narrow tapes at a very rapid rate.

A still further object of the invention is the provision of business machine controlled pneumatic circuitry and mechanisms for automatically controlling the operation of a tape perforating and feeding means adapted to perforate communication sized and spaced codes in narrow tape.

Other objects and many of the attendant advantages of this invention will be readily appreciated as the same becomes better understood by reference to the following detailed description in which like reference numerals designate like parts throughout the figures thereof and wherein.

Referring now to the drawings wherein like reference characters designate like or corresponding parts throughout the several views there is shown in Fig. 1 a block diagram of the general arrangement of the components of the invention.

Figure 1:
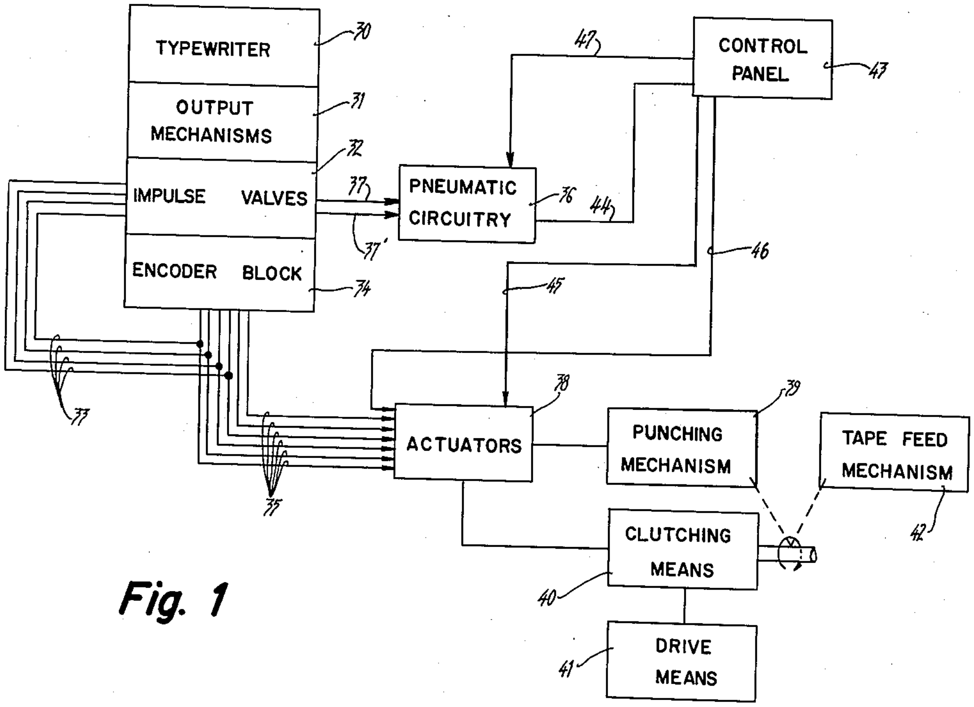
Fig. 1 is a block diagram of the record perforating system.

The invention employs a conventional electric typewriter 30. Output mechanisms 31 which will be specially described with reference to Figs. 12, 13, 14 and 15 are mounted on and below the frame of the typewriter and are adapted in response to key controlled typewriter actions to control impulse valves 32. The pneumatic impulses initiated by opening the impulse valves are conveyed either directly through lines, generally designated by reference numeral 33, or through an encoder block 34, to a plurality of output lines generally designated by reference numeral 35. Each of the output lines represents a successive binary level; the number of levels depending on the number of character, numeral, punctuation, and typewriter controls such as carirage return, tabulation, shift, etc. to be encoded. For example with six output lines up to 64 pieces of information may be converted to data processing machine language in accordance with a desired code such as a conventional six level Baudot code. Control impulses are also initiated in response to particular typewriter control actions such as carriage return, tabulation, back space, and are conveyed to pneumatic circuitry 36; the carriage return and tabulation control impulses over line 37 and the backspace control impulse over line 37'. The impulses in lines 35 are adapted to selectively actuate pneumatically responsive actuators 38 which effect the engagement of punches with punch powering means in a punching mechanism 39. Simultaneous with the engagement of punches with said punch powering means, a clutching means 40 responsive to actuation of any of the actuators effects the coupling of a drive means 41 to the punch powering means and to a tape feed mechanism 42 whereby a tape is perforated in synchronism with its movement through the punching mechanism. The pneumatic circuitry 36 is operative, after a tabulation or carriage return operation has been initiated and its code perforated, to disable the actuators 38 for a time sufficient for the carriage to move to a predetermined position. As will hereinafter appear, when the actuators are disabled, the punch and tape feed mechanisms are also disabled. This feature permits tabulate and carriage return codes representative of these functions to be automatically perforated without the necessity for spacing the tape after the codes have been perforated.

As will hereinafter more clearly appear with reference to Figure 28, a control panel is provided with an on-off valve for initiating on-off impulses in lines 44 and 45 for conditioning and disabling the pneumatically responsive actuators and hence the tape feed and punching mechanism, with individual impulse valves for initiating impulses in lines 46 connected to actuators respectively associated with an index or feed punch and with a special code hole punch, and with a pair of ganged tape error correction impulse valves for initiating pulses in lines 47. As will hereinafter be evident the impulses on lines 47 together with an impulse on the line 37' associated with the backspace impulse valve, act on the control circuitry 36 so as to effect backspacing of the tape while maintaining all of the actuators disabled over lines 44 and 45.

Referring to Figs. 2–11 there are shown the various valves and symbols therefor utilized in connection with this invention. It is necessary to be thoroughly versed in the operation of these valves to fully understand the operation of the instant invention. The description is therefore directed to their natures and functions.

Figure 2:
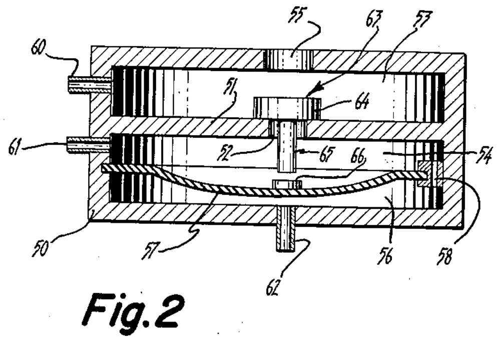
Fig. 2 is a diagrammatic cross sectional view of a secondary valve employed in the invention.

The valve illustrated somewhat diagrammatically in Fig. 2 is of the type which will hereinafter be referred to as a secondary valve. Describing first the structural characteristics of the secondary valve there is provided a valve body 50 having an internal partition wall 51 that is formed with an aperture 52 which pneumatically interconnects an upper chamber 53 with an intermediate chamber 54. The uppermost wall of the body 50 is provided with an aperture 55. A lower chamber 56 is provided in the body 50 by securing the periphery of a flexible diaphragm 57 to the vertical walls of said body. A restricted bleed passage 58 is provided as shown in order to pneumatically interconnect said intermediate and lower chambers 54 and 56. Pressure conduit lines 60, 61 and 62 respectively, communicate with the chambers 53, 54, and 56. A movable valve member 63 having head and stem portions 64 and 65 respectively is adapted to cooperate with the aperture 52 or the aperture 55 in a manner described below. A contact pad 66 is secured to upper side of the flexible diaphragm 57 and is adapted to engage the lower end of said stem 65 and lift said valve member 63 when diaphragm 57 is flexed upwardly.

In operation, the secondary valve of Fig. 2 is connected to a sub-atmospheric pressure source through the line 61 whereby a reduced pressure will normally exist in the pneumatically interconnected chambers 54 and 56. Chamber 53 will be open to the atmosphere through aperture 55. Under these normal pressure conditions the head 64 of valve member 63 will be held in engagement with the upper surface of partition wall 51 so that said head will overlie and pneumatically block the aperture 52. Valve member 63 is maintained in this position by reason of the differential pressure existing on either side of said head, the pressure in chamber 54 being sub-atmospheric and the pressure in chamber 53 being atmospheric. It will be apparent that the pressure in the valve output line 60 is normally atmospheric and that the pressure in the valve control line 62 is normally sub-atmospheric.

The valve is operated by initiating an atmospheric pressure impulse in the control line 62. This impulse will increase the pressure below the diaphragm 57 and before the pressure in chamber 54 is increased by air flow through the restricted bleed passage 58 the resultant pressure differential acting on the opposite sides of said diaphragm will cause the latter to be flexed upwardly thereby lifting and holding the valve member 63 in an elevated position wherein said head 64 overlies and pneumatically blocks the aperture 55. In this actuated condition of the valve, chamber 53 will be pneumatically connected through aperture 52 to said sub-atmospheric pressure source acting through line 61 whereby a sub-atmospheric pressure impulse will be initiated in the valve output line 60.

When the atmospheric pressure impulse in the control line 62 is terminated, the pressure in chambers 54 and 56 and in the line 62 will be restored to the normally sub-atmospheric level by the action of said source. When this occurs the valve member 63 and diaphragm 57 will be moved downwardly under the action of the pressure differential existing on the upper and lower surfaces of head 64 of valve member 63. The pressure in chamber 53 thus becoming atmospheric and hence greater than that in chamber 54 will cause said valve member 63 to be seated and held over the aperture 52 as shown in Fig. 2. At the same time the pressure in said output line 60 will be restored to the normal atmospheric level.

Figure 3:
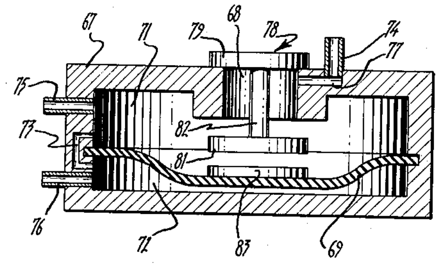
Fig. 3 is a diagramamtic cross sectional view of a primary valve utilized in the invention.

Referring to Fig. 3 there is diagrammatically shown a valve which will be hereinafter referred to as a primary valve. Describing first the structural characteristics of the valve there is provided a valve body 67 having an aperture 68 formed in the upper wall thereof. The interior of said valve body 67 is partitioned by means of a flexible diaphragm 69 thus providing an upper and lower chamber 71 and 72 respectively, said chambers being pneumatically interconnected by means of a restricted bleed passage 73. Three pressure conduit lines 74, 75 and 76 are connected to the primary valve. Line 74 pneumatically communicates with the upper chamber 71 through a passage 77 and said aperture 68, while lines 75 and 76 pneumatically communicate directly with the upper and lower chambers 71 and 72 respectively. A valve member 78 is operatively disposed in the said aperture 68 of the valve body, said member having upper and lower head portions 79 and 81 respectively and an interconnecting stem portion 82. A contact pad 83 is secured to the upper surface of the flexible diaphragm 69 in a position beneath the lower head portion 81 of said valve member.

In operation, the primary valve of Fig. 3 is connected to a sub-atmospheric pressure source through line 75 whereby a reduced pressure will normally exist in said pneumatically interconnected chambers 71 and 72. Under these pressure conditions the atmospheric pressure acting above the upper valve head 79 will retain the valve member 78 in its lower operative position as shown in Fig. 3 wherein said head portion 78 overlies and pneumatically blocks the upper end of aperture 68 and wherein the valve output line 74 is pneumatically connected with said upper chamber 71. In that the pressure in said chambers 71 and 72 is normally sub-atmospheric, it will be apparent the pressure in the valve control and output lines 76 and 74 respectively is normally sub-atmospheric.

The valve is operated by initiating an atmospheric pressure impulse in the valve control line 76. This impulse will increase the pressure in chamber 72 and before the pressure in chamber 71 is also increased by air flow through the restricted passage 73 the differential pressure acting on the opposite sides of the diaphragm 69 will cause the latter to be flexed upwardly thereby lifting and holding the valve member 78 in an upper operative position wherein the lower head portion 81 thereof overlies and pneumatically blocks the lower end of said aperture 68. In this actuated condition of the valve the upper end of the aperture 68 will be open to the atmosphere and hence an atmospheric pressure impulse will initiate in said passage 77 and in the valve output line 74.

When the atmospheric pressure impulse in the control line 76 is terminated the pressure in chambers 71 and 72 will be restored to the normal sub-atmospheric level by the action of said source. When this occurs the valve member 78 and the diaphragm 69 will be moved downwardly from its upper position under the action of the differential pressure existing on the upper and lower sides of said valve head portion 82 and will be thereby restored and held in said normal lower position, as shown in Fig. 3. Thus the valve output line 74 is again pneumatically connected to the chamber 71 and hence the pressure in said output line 74 will be reduced to the normal sub-atmospheric level.

It is important to note that the primary and secondary valves operate only momentarily and during such time as impulses are admitted to the control chambers thereof. As soon as an impulse or series of impulses are terminated, the valves will automatically reset to their normal position.

Figure 4:
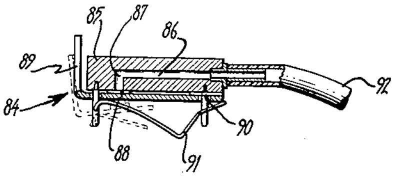
Fig. 4 is a diagrammatic cross sectional view of an impulse valve.

Referring to Fig. 4 there is shown an impulse valve construction 84 comprising a valve body 85 having a passage 86 formed therethrough. One end 87 of said passage is normally closed by means of a leather pad 88 attached to an actuating arm 89 which is pivotally mounted as at 90 to said valve body 85 by any suitable means. A leaf spring 91 normally biases said arm in a clockwise direction whereby the leather pad 88 or a pad of similar material secured to the inner side of said arm 89 overlies said end 87 of passage 86. The other end of passage 86 is normally in communication via an output line 92 to a sub-atmospheric pressure source through a bleed passage as will hereinafter be apparent. Actuation of arm 89 opens the end 87 of passage 86 to the atmosphere thereby initiating an atmospheric impulse in output line 92. It is to be understood that the valve body may be constructed with a plurality of passages all closed by pads on a single actuating arm to form ganged impulse valves.

Figure 5:
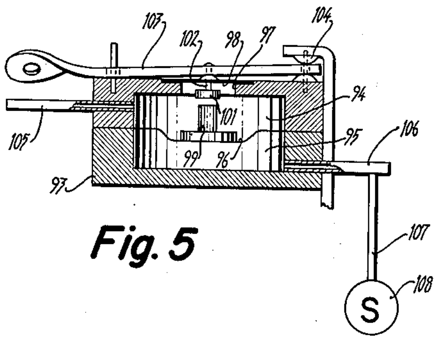
Fig. 5 is a diagrammatic cross sectional view of a pouch actuator.

Referring now to Fig. 5 there is shown a pouch actuator adapted to convert atmospheric impulses into mechanical movement. The pouch actuator comprises a hollow body 93 separated into an upper pouch chamber 94 and a lower control chamber 95 by a flexible primary diaphragm 96 suitably secured to the vertical walls of the body. The upper pouch chamber 94 is provided with an aperture 97, which is permanently closed and sealed by a flexible secondary diaphragm 98. The upper side of the primary diaphragm has attached thereto a contact button or pad 99. The underside of the secondary diaphragm has a contact button or pad 101 attached to a stem member 102 which extends through the secondary diaphragm without destroying the seal. The stem member 102 is connected externally to an actuating lever arm 103 suitably pivoted to the pouch body as at 104. Both chambers 94 and 95 are provided with passages to which pressure conduit lines 105 and 106 respectively are secured. The pouch chamber is normally at sub-atmospheric pressure through connection of conduit 105 to a source of sub-atmospheric pressure. The conduit 106 and the control chamber 95 are normally at sub-atmospheric pressure through connection with a sub-atmospheric source 108 via a restricted bleed passage 107.

In operation, a pulse of atmospheric air is introduced into control chamber 95 through control conduit 106; the bleed passage 107 being insufficient to affect or draw off the impulse immediately. The pressure differential existing between chambers 94 and 95 causes the primary diaphragm 96 to flex upwardly with the result that the primary pad 99 strikes the secondary pad 101. The force of the impact causes the actuating arm 103 to move outwardly. Upon termination of the atmospheric impulse the control chamber 95 is reevacuated through bleed passage 107 and the primary diaphragm 96 and actuating arm return 103 to their normal positions as shown.

The invention also utilizes an actuating valve which is merely a combination of a pouch actuator and an impulse valve. The pouch chamber 94 of the actuating valve is normally in communication with atmospheric pressure while the control chamber 95 is at sub-atmospheric pressure through connection to the sub-atmospheric source 108 via bleed line 107. The actuating arm 103 of the pouch actuator half of the actuating valve is adapted to control the actuating arm 89 of an impulse valve.

In operation the actuating valve is conditioned by drawing off atmosphere from pouch chamber 94 through line 105 and thereafter transmitting an atmospheric impulse to the control chamber 95 through line 106 whereby the primary diaphragm will flex upwardly with the result that the primary pad 99 strikes the secondary pad 101. The force of the impact will move the actuating arm 103 outwardly thereby moving the actuating arm 89 of the impulse valve half of the actuating valve with the result that an atmospheric impulse is initiated in the output line 92 thereof.

It will be understood that the showing in Figs. 2–5 is for the purpose of illustration only and is not to be taken as setting forth the exact constructional details or dimensions of the valves and actuator.

Figure 6:
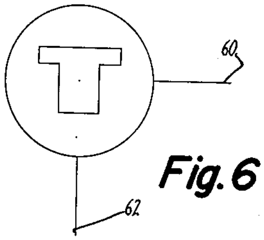
Figs. 6–11 are symbols used to designate respectively a secondary valve, a primary valve, an impulse valve; a pouch actuator, an actuating valve, and a bleed passage.

The symbols for the secondary, primary, impulse and actuating valves, and the symbol for a pouch actuator are shown in Figs. 6–10. In Fig. 6 the secondary valve control and output lines are shown at 62 and 60 respectively. The pressure in control line 62 is normally sub-atmospheric, and the pressure in line 60 is normally atmospheric. When an atmospheric pressure impulse is transmitted through the control line 62, a sub-atmospheric pressure impulse will be initiated in said output line 60.

Figure 7:
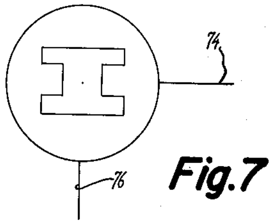

In Fig. 7 the primary valve control and output lines are shown at 76 and 74 respectively. The pressure in control line 76 and the output line 74 is normally sub-atmospheric. When the valve receives an atmospheric pressure impulse through line 76, an atmospheric pressure impulse will be initiated in said line 74.

Figure 8:
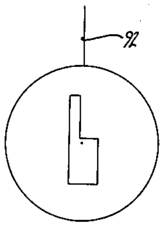

In Fig. 8 the pressure in the output line 92 of the impulse valve is normally sub-atmospheric, hence when said valve is operated an atmospheric pressure impulse will be initiated in said line 92.

Figure 9:
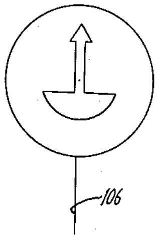

In Fig. 9 the pouch actuator control line is shown at 106. The pressure in control line 106 is normally sub-atmospheric and when an atmospheric impulse is transmitted through control line 106 the actuating arm 103 thereof is moved.

Figure 10:
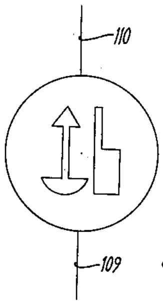

In Fig. 10 the actuating valve control line is shown at 109 and the output line at 110. Both lines are normally at sub-atmospheric. When an atmospheric impulse is transmitted through control line 109 after the pouch actuator half has been conditioned it causes an atmospheric pulse to be initiated in output line 110.

Figure 11:
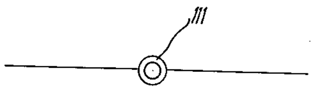
Figure 28:
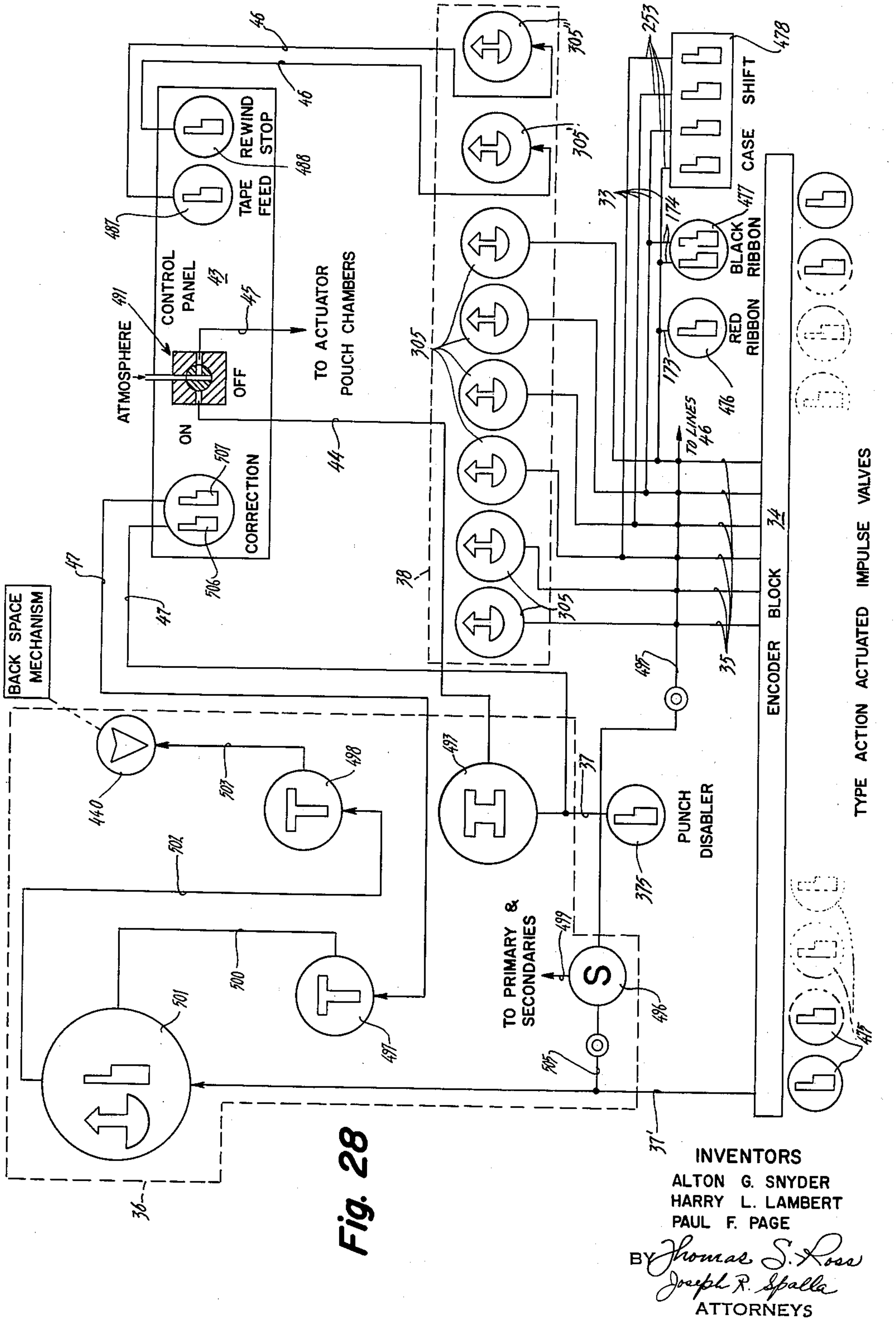
Fig. 28 is a schematic diagram of the pneumatic circuitry of the invention.

Fig. 11 shows the symbol for a conventional type restriction or "bleeder" 111 which is interposed in several of the above described structures and control lines shown in the circuit diagram of Fig. 28.

Referring now to Figs. 12, 13 and 14 and 15 there is shown only enough of the standard or known Royal electric typewriter construction to assist in illustrating the manner in which mechanism embodying the invention are incorporated therewith. The typewriter as is understood employs an electrically driven power transmitting element, preferably a snatch roll 115 which operates continuously, and controllable driving connections for operating typewriter instrumentalities e.g. type bars, space bar, carriage return, tabulator, case shift, and back space, which normally are inoperative or ineffective, but which may be operatively connected to the drive transmitting element through operator controlled key levers.

Figure 12:
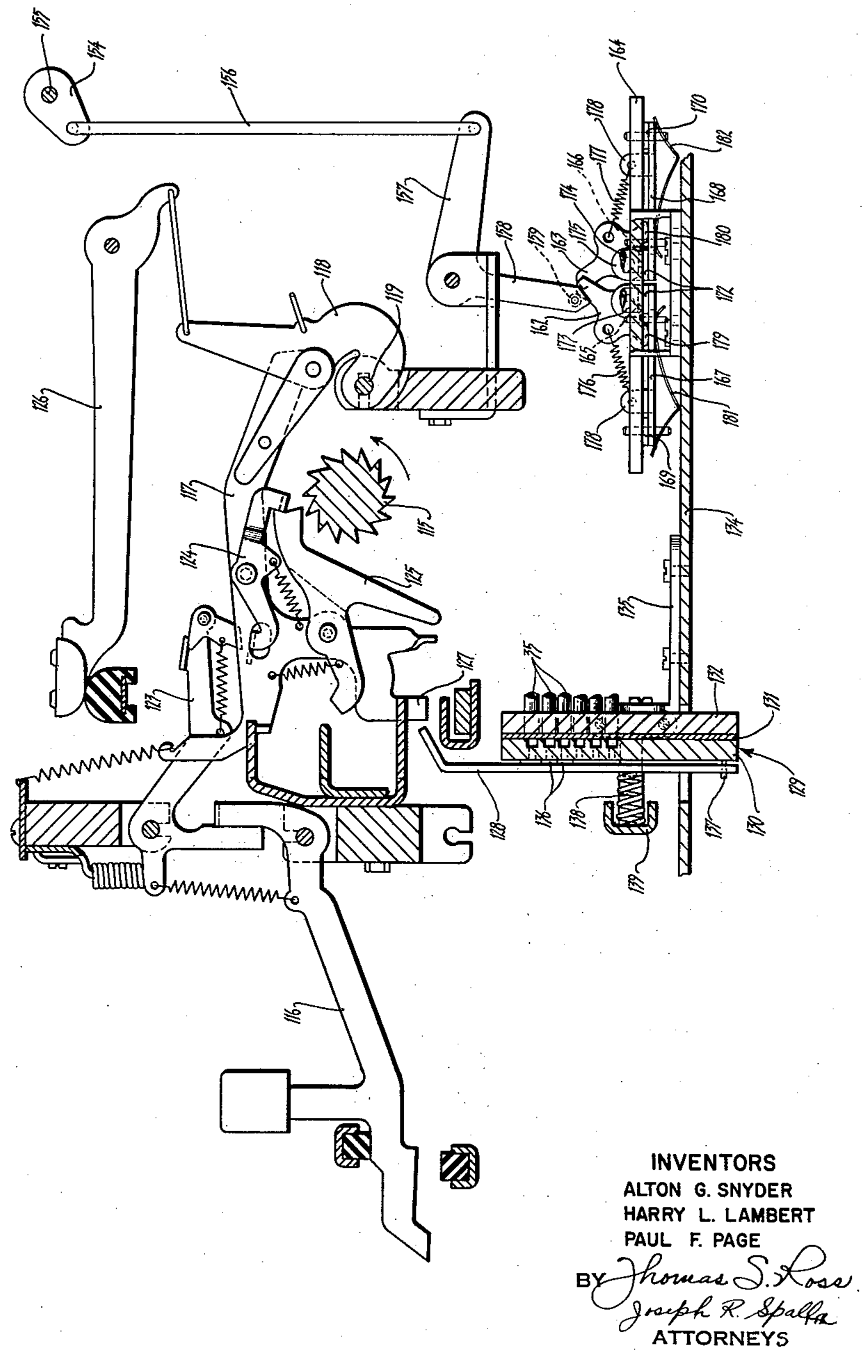
Figs. 12, 13 and 14 are cross sectional views showing the operating mechanisms of an electric typewriter including only those parts necessary to understand the invention and showing output mechanisms arranged in operative relationship with respect to the typewriter.

The drive connections for a type bar key lever 116 as seen in Fig. 12, comprises an actuator 117 which extends fore and aft of the typewriter above the snatch roll. All the type bar actuators are connected at their forward ends to bell crank levers 118 which are pivotally mounted on a universal rod 119 mounted in a bar secured to the frame sides.

As is conventional, depression of a key lever 116 rotates a lever arm 123 clockwise. Clockwise movement of lever arm 123 causes the rotation of a pawl latching member 124 in a direction as to release a pawl 125 rotatably mounted on the actuator 117 to engage and be driven forwardly by the snatch roll 115. The forward movement of the pawl carries with it the actuator 117 thereby rotating the bell crank 118 which causes a type bar 126 to go through a printing stroke. The actuators 117 have forwardly and downwardly extending arms 127 each of which serves in the instant invention to control an actuating arm 128 of associated impulse valves incorporated in encoder block 34. As seen in Fig. 12 the actuating arms 128 extend from the encoder block into the path of motion of the downwardly extending arms 127.

As seen in Fig. 12 the encoder block 34 comprises a front plate 130, a gasket plate 131, and a rear plate 132 all secured together by bolts through mounting holes 133 (Figs. 16 and 17) and to a base plate 134 by a bracket 135. The actuating arms 128 which are provided with leather pads 136 in the sides adjacent the front plate are individually pivoted as at 137 to the front plate 130. Each actuating arm is individually biased against the front plate by a spring 138 mounted between the individual actuator arms and a spring mounting bracket 139 secured at its ends to the ends of the encoder block 34 by any suitable means.

Figure 16:
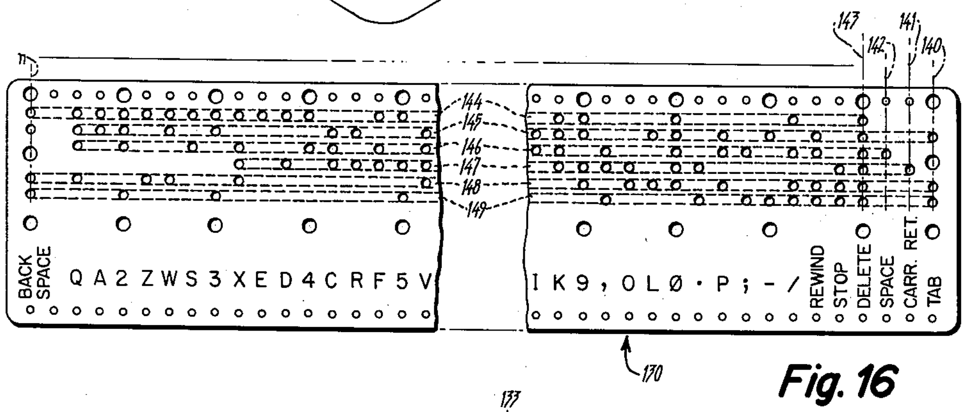
Figs. 16 and 17 are front elevational views showing the pneumatic encoder unit construction.
Figure 17:
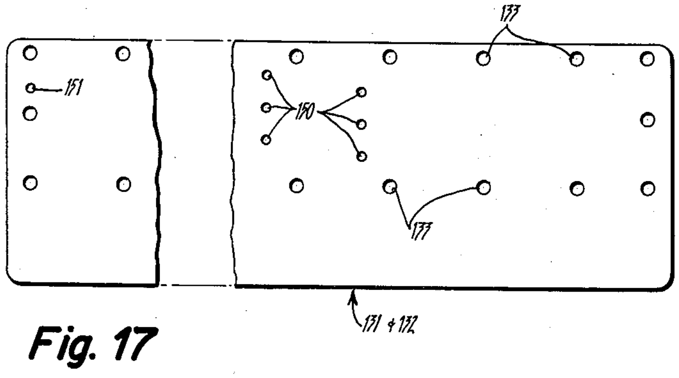

Referring to Figs. 16 and 17 the front plate 130 of the encoder block is provided along its length with vertical columns 140, 141, 142, 143 . . . *n* of hole combinations, the number and level of the holes in each column depending on a desired coding arrangement. In the embodiment shown six levels are provided. Each column of hole combinations is covered by the pads 136 on one of the actuating arms 128 whereby each column in conjunction with its associated actuating arm forms a coded combination of ganged impulse valves. The rear surface of the front plate is formed with six horizontal channels or grooves 144, 145, 146, 147, 148, 149 one behind each of the six levels of holes in the front surface thereof. The gasket 131 and rear plate 132 are similar and are the same size as the front plate 130. Both are provided with six centrally located holes 150, one opposite each level, and with a seventh hole 151 opposite a level two hole in one end of the front plate. As seen in Fig. 16 the level two groove 145 in the rear surface of front plates does not extend behind the level two hole 151 in the end of the front plate for reasons which will hereinafter appear.

Actuation of any of the impulse valve actuating arms 128 causes atmospheric impulses to enter a column of holes. The impulses are carried by the channels 144—149 in the rear of the front plate to one or more of the six output lines 35 connected to the six holes 150 in the rear plate, corresponding to each of the six levels in the front plate. With each of the six levels representing a successive binary order up to 64 hole combinations representing characters, numerals, punctuation, and control functions are possible. In accordance with the invention a six level Baudot code character representation is illustrated; it being understood that any type of coding may be employed.

Again referring to Fig. 12 there is shown an arm 154 mounted on a shaft 155 adapted to rotate between predetermined arcuate limits. This shaft 155 as is understood is associated with a black and red ribbon color control key normally mounted on the front of the machine. As is understood in the art movement of the color control key operates mechanisms (not shown) which determine the vertical throw of the typewriter ribbon vibrator. The arm 154 is pivoted to one end of a link 156 whose other end is coupled to the free end of a second lever 157 pivoted to the machine. Lever 157 is provided with a downwardly extending arm 158 provided at its free end with a stud 159 adapted to operate one or another of left and right color control impulse valve by-pass cams 162 or 163 respectively when the arm 158 is at one or the other of its two limits of motion. As seen in the figure a valve body 164 provided with two sets of holes 165 and 166 respectively representing red and black ribbon codes is secured to the base plate 134 of the typewriter. The actuating arms 167 and 168 for the red and black impulse valves are pivoted to the underside of the valve body as at 169 and 170 respectively and are each provided with leather pads 172 which normally close the holes 165 and 166 in the valve body connected to output lines 173 and 174 associated with each actuator arm. Output lines 173 and 174 are connected to lines 33 (Figures 1 and 28). The cams are pivoted to ears 175, extending vertically from an upturned edge of each of the actuating arms and are connected by springs 176 and 177 to anchors 178 extending from upturned edges of the actuating arms. The lobes 179 and 180 of each of the cams 162 and 163 respectively extend below the valve body 164 and are biased against their associated actuating arms by their return springs. The lobes are adapted upon movement of their associated cams to pivot associated impulse valve actuating arms away from the valve body. The actuating arm return springs 181 and 182 are relatively stronger than cam return springs 176 and 177.

From the positions shown, if arm 158 is rotated counter clockwise about its pivot the stud 159 thereon will rotate cam 162 clockwise about its pivot against the restraining force of return spring 176 which will raise its lobe 179 from the actuating arm 167. As is apparent the actuating arm 167 will not be moved since its spring 181 is relatively stronger than spring 176. As the stud 159 rides over cam 162 it engages the right cam 163 depressing and causing its lobe 180 to depress the actuating arm 168 which opens the lines 174 associated therewith to atmosphere. As the stud on arm 159 rides past the right cam 163 the actuating arm return spring 182 will close the openings 166 so that cam 163 resumes its normal position as shown. At this point the stud 159 will be to the right of the right hand cam 163 and will remain so until the color control key is changed back. As will be understood, the number of holes and output lines in the valve body associated with each actuating arm will be in accordance with a chosen code.

Figure 13:
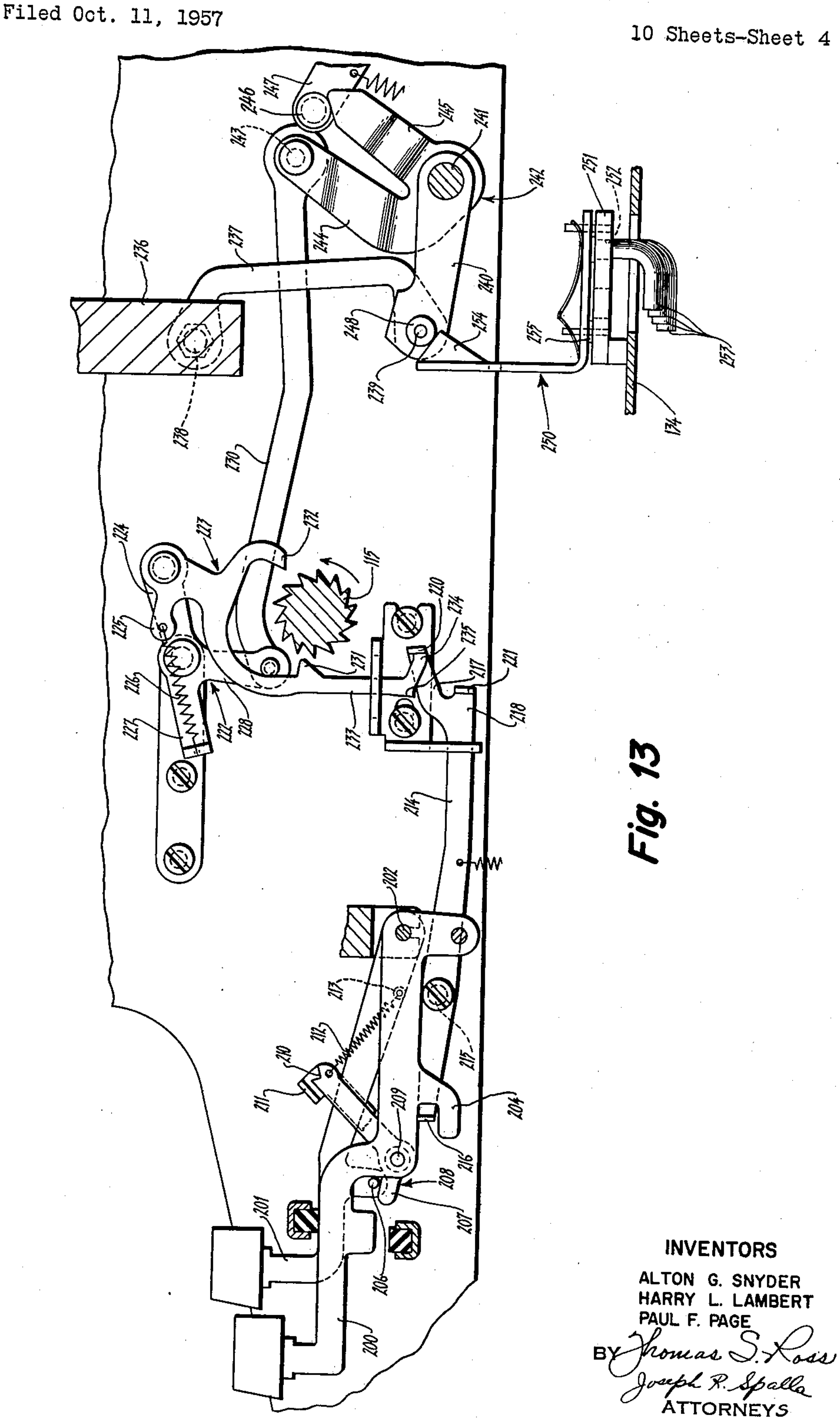

Referring now to Fig. 13 there is shown the structure of a conventional Royal electric case shift mechanism. The mechanism is controlled by a shift key structure including a shift key lever 200 and a shift lock key lever 201. The shift key lever 200 is fulcrumed on a rod 202 mounted in a frame cross bar. The lower edge of the shift key lever is provided with a downwardly and forwardly extending tab 204 which is spaced from the body portion of the key lever. The shift lock key lever is also pivoted as at 202 and is equipped with a pin 206 overlying a tail 207 on a detent or pawl 208 which is pivoted at 209 on the shift key 200. The pawl 208 is formed with a notch 210 which normally is disengaged from an ear 211 fixed to the typewriter frame; the pawl 208 being held in the position shown by a spring 212 connected to the pawl and anchored at 213 to the shift key lever. In operation, when the shift lock key 201 is depressed its pin 206 presses on the tail 207 of the pawl 208 so as to rock the rear and upper end of the pawl into engagement with the flat rear face of the fixed ear 211, which stops rocking of the pawl relative to the shift lock lever. Further depression of the shift lock lever then causes downward movement of the shift key on which the pawl is mounted, thus causing the segment shifting mechanism to be described to operate. During a slight further downward movement of the shift lock lever the front edge of the rear end of the pawl 208 will move below the ear 211 permitting the pawl to rock a little further so as to enable the notch 210 in the pawl to receive the lower edge of the fixed ear 211. The above holds the shift and shift lock levers depressed. In order to return the parts to normal positions the shift key 200 is depressed so as to permit the spring 212 to return the pawl 208 to its normal nonlatching position.

The segment shifting mechanism comprises an actuator 214 fulcrumed on a frame mounted shaft 215. The actuator is provided at its forwardly extending end with an ear 216 adapted to extend between the body portion and spaced tab 204 on the shift key lever 200. The arrangement is such that when the shift or shift lock key levers are depressed the actuator 214 will move counterclockwise about its fulcrum 215. The rearwardly extending end of the actuator 214 is provided with two angularly disposed arms 217 and 218, the ends of which are provided with ears 220 and 221 respectively.

As seen in Fig. 13, a lever 222 is rotatably mounted on the frame. A pawl 223 is pivoted to the end of a rearwardly extending arm 224 of the lever. A tail portion 225 of the pawl is connected by a spring 226 to the end of a forwardly extending arm 227 of the lever. The lever also is provided with a downwardly depending arm 228 which is pivotally connected to a link 230. As seen in the figure the pawl 223 is provided with two teeth 231 and 232 respectively, adapted to be engaged by the snatch roll 115. The pawl is also provided with a downwardly extending substantially L-shaped tail portion 233. The end 234 of the tail portion normally abuts the ear 220 on the upper arm 217 of the actuator 214 whereby the pawl 223 is held away from the snatch roll 115. Depression of the shift key 200 releases the tail portion of the pawl from ear 220 and permits the spring 226 to rotate the pawl about its pivot so as to cause tooth 231 to engage the snatch roll, which drives the pawl downwardly thereby rotating the lever 222 about its pivot and pulling the link 230 forwardly. The forward edge 235 of the L-shaped tail portion engages the rearward side of ear 221 on the lower arm 218 of the actuator 214 after the pawl has been driven downwardly thereby holding the pawl out of engagement with the snatch roll and the lever 222 rotated clockwise for as long as the shift key lever is held depressed. Upon release of the shift key lever 200 the pawl is again released and rotates clockwise so as to cause engagement of tooth 232 with the snatch roll 115 which returns the pawl, lever and link 230 to the positions shown.

The segment 236 is mounted to shift vertically on the typewriter frame in conventional manner. Mechanism for shifting the segment includes a link 237 pivoted as at 238 to the segment and pivoted as at 239 to a rock arm 240 mounted on a shaft 241 suitably mounted on the typewriter frame. A bifurcated lever 242 is also mounted on shaft 241. The rearwardmost end of the pull link 230 is pivoted as at 243 to one arm 244 of the lever 242 whereby when it is actuated forwardly as heretofore described it rotates lever 242 and rocks arms 240 counterclockwise pulling down the segment. The other arm 245 of lever 242 is adapted to cooperate with a stud 246 on a spring biased lever 247 whereby the segment will remain shifted down when in a locked position. In accordance with the invention the pivot 239 is provided with a stud 248 which operates the actuating arm 250 associated with an impulse valve body 251 whenever the segment 236 is shifted.

The valve body is mounted on the base plate 134 of the typewriter and is provided with a plurality of holes 252 representing the segment shift code to which output lines 253 are connected. The actuating arm for the shift impulse valves extends upwardly toward the typewriter and is provided adjacent its end with a triangular projection 254 which is located in the path of motion of the projecting stud 248. Downward movement of the stud 248 rocks the actuating arm about its pivot 255 simultaneously opening and then closing the holes 252 in the valve body forming the impulse valves as does upward movement thereof. As is apparent atmospheric impulses are initiated in output lines 253 which are connected via lines 33 (Figure 28) to lines 35 representative of the shift code. When the segment is locked the stud 248 occupies a position beneath the triangular extension 254.

It will be apparent that only a single code is provided for upper and lower case control. During readout of the record as disclosed in copending application Ser. No. 690,099 of Lambert, Page and Snyder (now Patent No. 2,894,614), whenever a shift code is sensed the case shift mechanism will shift either up or down depending on whether it is up or down when the code is sensed.

Figures 14, 15:
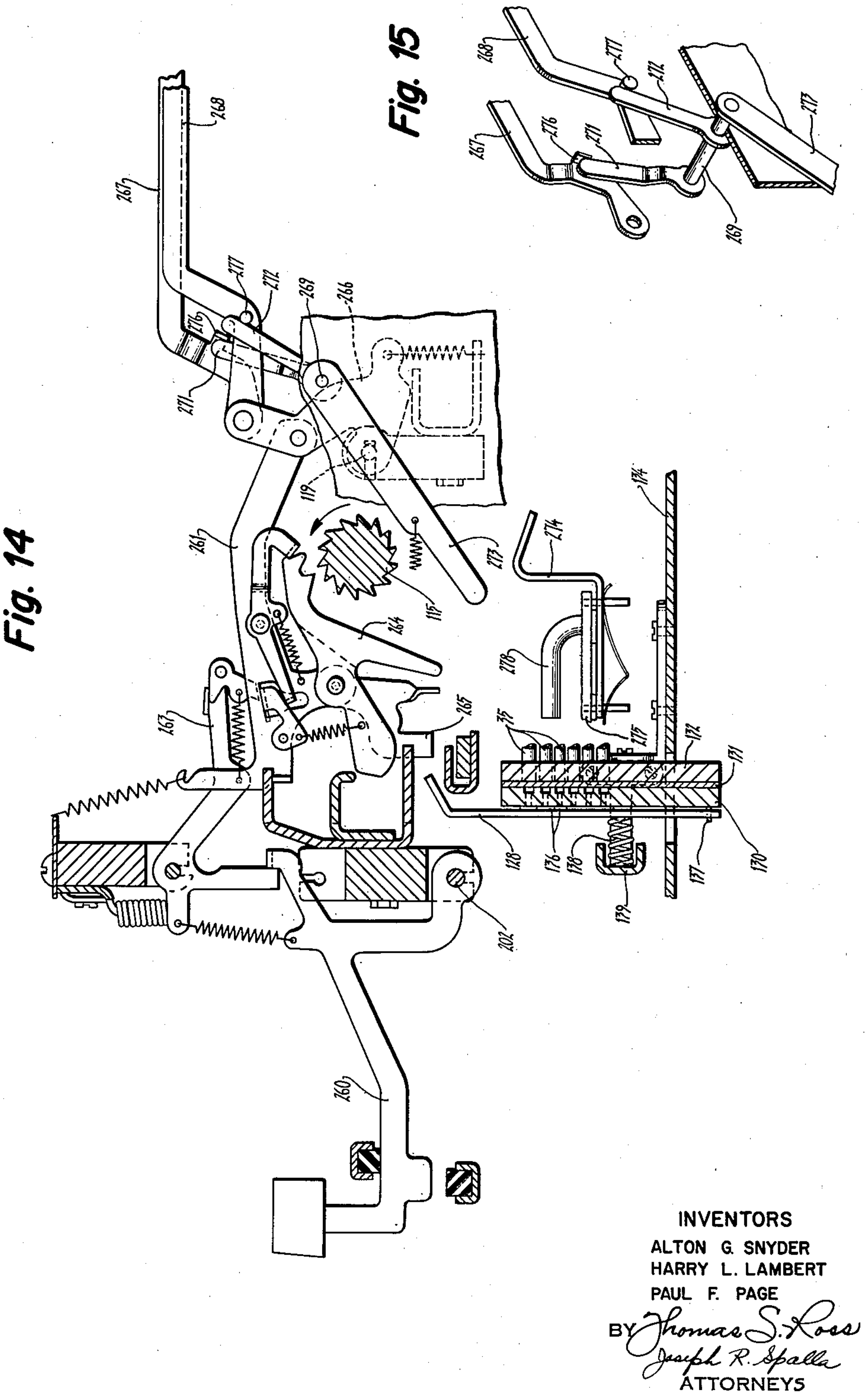
Fig. 15 is a fragmentary perspective view of levers shown in Fig. 14.

Referring to Figs. 14 and 15 there are shown the drive connections associated with the carriage return and tabulator key levers 260. The drive connections associated with each comprises an actuator 261 which extends fore and aft of the typewriter above the snatch roll 115. Both the carriage return and tabulator key levers are fulcrumed at their forward ends on the universal rod 202. Each of the carriage return and tabulator key levers are operable through levers 263 to release a pawl 264 rotatably mounted on the actuators 261 whereby the pawl and actuators will be driven forwardly. Each of the actuators 261 are also provided with forwardly and downwardly extending arms 265 which serve to operate associated actuating arms 128 on the encoder block associated therewith as described with reference to Fig. 12 whereby carriage return and tabulator coded impulses are initiated in output lines 35.

As seen in Figs. 14 and 15 the tabulator and carriage return bell cranks, generally designated by reference character 266 are secured to links 267 and 268 respectively which extend rearwardly. These links are adapted to control the carriage moving mechanisms in a carriage return or tabulation direction in a conventional manner. As seen most clearly in Fig. 15 a shelf 269 suitably supported on the typewriter frame rearwardly and upwardly from the bell crank universal bar 119 carries a pair of spaced arms 271 and 272 extending upwardly and rearwardly therefrom and an arm 273 extending downwardly and forwardly therefrom. All the arms are movable with the shaft 269. The arm 273 is operative upon counterclockwise rotation of shaft 269 in response to depression of the carriage return or tabulator key to control the actuating arm 274 of a punch disabling valve 275 positioned in its path of motion. The arm 273 is operative through an offset tab 276 on the tabulator link 267 which when operated forwardly engages the arm 271 and rotates the shaft 269 counterclockwise. The arm 273 is also operative through a stud 277 mounted on the carriage return link 268 which when operated forwardly engages the other arm 272, again rotating the shaft 269 counterclockwise. The bell crank levers 266 associated with carriage return and tabulation, and hence the links 267 and 268 remain actuated while the carriage is moving as is understood in the art to prevent operation of any of the type bars during movement of the carriage. As a consequence the punch disabling impulse valve 275 remains open for as long as the carriage is in motion thereby delivering an atmospheric impulse to line 37 connected to the output passage thereof.

Figure 18:
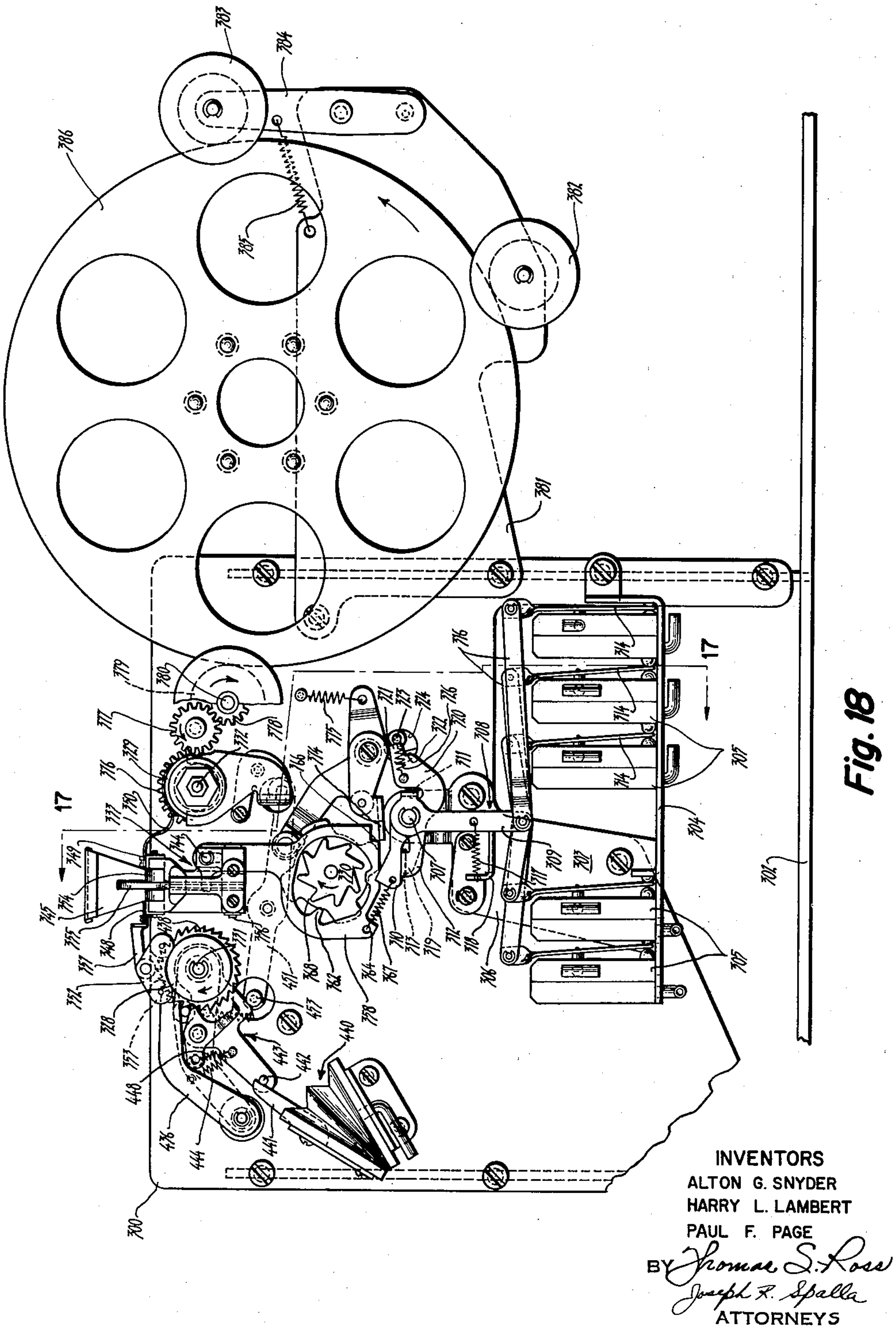
Fig. 18 is an elevational view showing the principal parts and the arrangement thereof of the record perforating and feeding mechanism in accordance with the invention.
Figure 19:
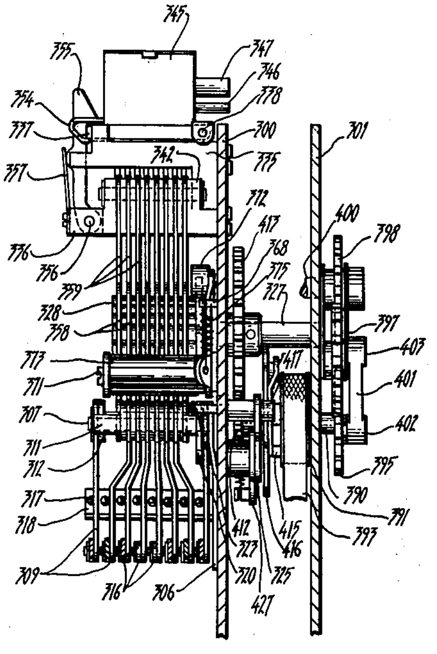
Fig. 19 is a view taken along lines 19—19 of Fig. 18.

Referring now to Figs. 18 and 19 the perforating and feeding mechanisms are mounted on and between a front and a rear mounting plate 300 and 301 respectively which are disposed in parallel vertical planes and secured to a base plate 302. The front plate has secured thereto a latch mounting plate generally designated by reference character 303 (Fig. 18) having a horizontal portion 304 extending from the plane of the front mounting plate which supports a plurality of pouch actuators 305 and a vertical portion 306 secured to the front mounting plate which mounts a shaft 307. The shaft 307 pivotally mounts a plurality of pawl latch members generally designated by reference character 308 having a vertical stem portion 309 below the pivot shaft 307 and a pawl latching portion 310 extending laterally from the pivot shaft. As shown in Fig. 19, the stem and latching portions of the outwardly mounted latch members 308 are horizontally spaced by connecting portions 311. The outwardly mounted latch members are so formed as to permit a clutch control bail 312 to be pivotally mounted on shaft 307 between the stem and latching portions of said outwardly mounted members 308 with the universal portion 313 (Fig. 18) thereof extending beneath all of the pawl latching portions 310 of the latch members.

As seen in Fig. 18 the stem portions 309 of the latch members 308 are coupled with the actuating arms 314 of the pouch actuators 305 through links 316 and are resiliently coupled by latch return springs 317 to a spring mounting bracket 318 secured to and extending horizontally from the latch mounting plate 303. As shown in Fig. 18 and in 20—22 the pawl latching portion 310 of the pawl latch member associated with the feed or index hole punch is bifurcated whereby the lower portion 319 thereof encompasses the universal portion 313 of the clutch control bail 312 so that the feed or index hole pawl latch member will be unlatched upon actuation of any other of the latch members 308. The clutch control bail 312 is also provided with a tail portion 320 adjacent the front plate 300 whose end 321 is provided with a step 322.

The end 321 normally bears against a stud 323 extending through a hole 324 in the front mounting plate. The end 321 is adapted to hold said stud and a clutch control latch 325 (Figs. 23 and 24) to which the stud 323 is attached, in a latched position against the force of a biasing spring 326 secured between said stud 323 and tail portion 320.

Extending through the front plate is a shaft 327 (Fig. 19) on which is mounted a snatch roll 330 adapted to be driven as will hereinafter appear. An idler and a sprocketed tape feed roll 328 and 329 respectively (Fig. 18) are rotatably mounted on shafts 331 and 332 which extend through the front plate 300 to either side of a tape perforating station, generally designated by reference character 333, fixedly secured to the front plate above the snatch roll. The hole 334 (Fig. 27) through which the idler roll shaft 331 extends is relatively larger than the shaft 331 for reasons which will hereinafter appear.

Figure 20:
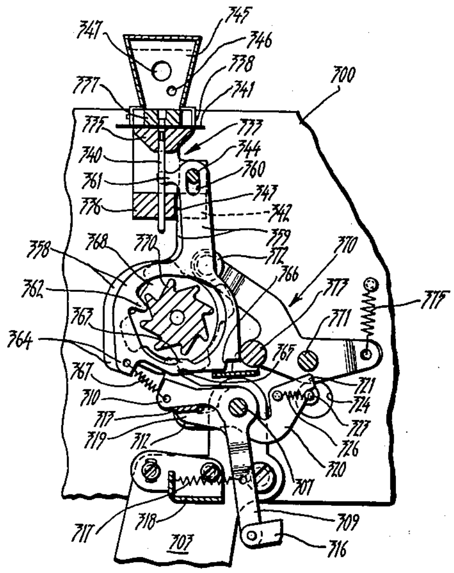
Figs. 20–22 are fragmentary elevational views showing the record perforator in successive operating positions.
Figure 21:
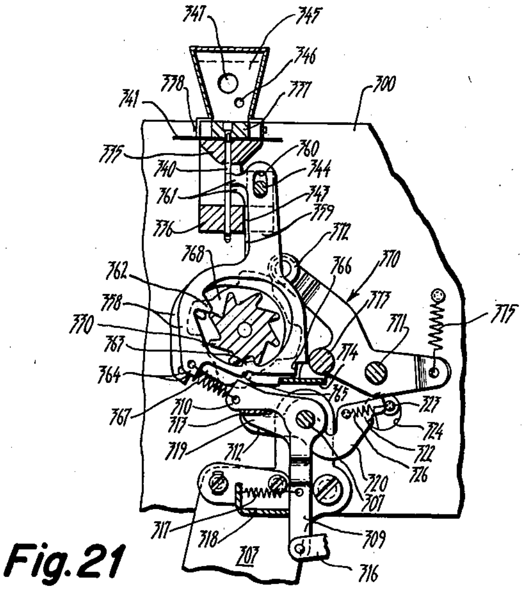
Figure 22:
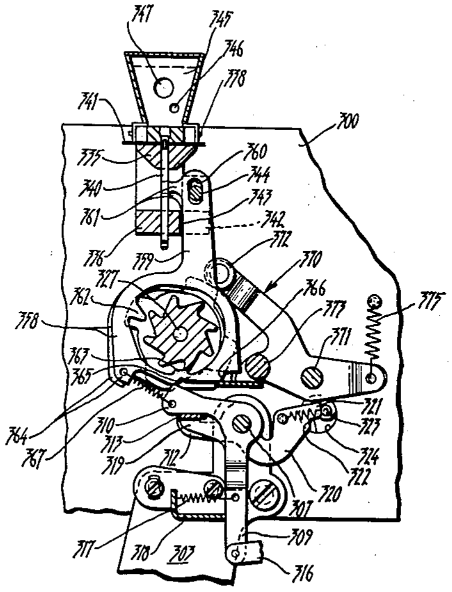

The tape perforating station 333 as seen most clearly in Figs. 19–22 comprises vertically spaced upper and lower punch guide platforms 335 and 336 respectively, and a punching head 337 rotatably mounted as at 338 (Fig. 19) to the upper guide platform adjacent the front plate. As is understood in the art the guide platforms and punching head are provided with a plurality of aligned holes adapted to receive communication sized and spaced punches 340 (Figs. 20–22) whereby a tape 341 passing between the punching head and the upper guide platform will be perforated by selectively driven punches. The lower guide platform 336 as seen in Figs. 20–22 has a section 342 which extends laterally toward the sprocketed tape feed roll and upwardly toward the top edge of the front plate. The section is provided with a plurality of parallel slots 343 in planes parallel to the plane of the front plate. A shaft 344 is fixedly mounted across the upward extension of section 342 in holes bored through the ribs formed by slotting the section.

As seen in Figs. 18–22 and more particularly Figs. 18 and 19 the top surface of the punching head is enclosed by a box-like structure 345. Air inlet and exhaust lines 346 and 347 respectively are connected to the box-like enclosure. Line 346 is adapted to be connected to the exhaust of the sub-atmospheric pump employed in the invention whereby chaff will be blown out through the exhaust line 347. Flanges 348 and 349 (Fig. 18) are provided on the bottom of and to either side of the box-like structure. Flange 349 mounts a resilient tape hold down member 350. Flange 348 mounts a resilient arm 351 to which is secured a pair of spaced brackets 352 on which are rotatably mounted a pair of spaced rollers 353 adapted as will hereinafter appear to cooperate with the idler roll to back space the tape being perforated.

As shown in Figs. 18 and 19 the forward bottom edge of the box-like structure carries a forked flange 354 which extends over the forward edge of the punching head 337 and grips the lower surface thereof. This expedient relieves any strain on the air tight seal between punching head and the box-like structure when the punching head is raised. A latching member 355 is rotatably secured on a shaft 356 mounted between forwardly projecting extensions of the lower guide platform. As seen in Fig. 19 the latch member 355 is biased in latching engagement with the upper edge of the punching head, which edge extends beyond the box-like structure, by a leaf spring 357 secured to the lower guide platform. As is apparent the punching head may be unlatched to enable insertion of a tape by rotating the latch member 355 away from the punching head against the force of the biasing spring.

A plurality of ring like punch driving pawls 358 (Figs. 18–22) equal in number to the number of pouch actuators are axially disposed around the snatch roll 330 and are each provided with a vertically extending arm 359 which is provided with an elongated hole 360 adjacent its upper end to enable it to be mounted on the shaft 344 for movement within the slots 343 of the lower guide platform. The upper ends of the pawl arms 359 are also provided with lateral extensions 361 which extensions are adapted to fit in notches formed in the punches 340 disposed in and guided by holes in the upper and lower guide platforms of the die block. The internal edges of the ring like pawls are formed with a pawl driving tooth 362 adapted to engage the snatch roll thereby to drive said pawls upwardly and with a pawl restoring tooth 363 (Figs. 20–22) adapted to be engaged by the snatch roll thereby to return said pawls to a latched position. The outer edges of the pawls are provided with ears 364 and peripherally spaced notches 365 and 366. Notches 365 (Fig. 21) are adapted to cooperate with latch members 308 whereby the pawls are maintained in an inoperative latched position as shown in Fig. 18. A spring 367 connected between the ear 364 of each pawl and each latch member is biased to hold the latch members and pawls in engagement. Secured to the end of the snatch roll adjacent the front wall is a four lobed interlock cam 368. The interlock cam is adapted to actuate a latch bail assembly 370 (Figs. 20–22) pivotally mounted to the front plate as at 371. The bail assembly is adapted to be rocked about its pivot each punching cycle by one of the interlock cam lobes which ride over and cam a stud 372 mounted on the latch bail assembly. A bar 373 rotatably mounted on the latch bail assembly is adapted to limit the motion of released pawls. As the latch bail assembly is rocked by the interlock cam the universal portion 374 thereof is adapted to move into the notches 366 of those punch driving pawls not selected and to maintain them in a latched position as selected pawls are being driven through a cycle. The latch bail assembly is biased in the position shown in Fig. 18 by a return spring 375 secured to front plate 300.

Referring again to Fig. 18 there is shown a gear 376 secured to the sprocketed feed roll 329 adjacent the front plate which is adapted to mesh with an intermediate gear 377 which drives a gear 378 on a flanged take up spool drive roller 379 having a rubber covered core and whose shaft 380 is rotatably mounted in the front plate. A tape take up spool mounting bracket 381 is secured to the front plate 300 and carries a fixed axis flanged roller 382 on its lower extremity. Another flanged roller 383 is rotatably mounted on a link 384 which is rotatably mounted on the spool mounting bracket. The latter roller and link are biased in the position shown by a spring 385 secured to the mounting bracket and the link. A flanged take up spool 386 is rotatably supported by and within the flanges of all three rollers. The spring biased roller translates to the right to allow the insertion of the take up spool 386 and thereafter urges the spool 386 against the take up spool drive roller 379 whereby friction between the rubber core of the drive roller and the flange of the take up spool will rotate the latter.

Figure 26:
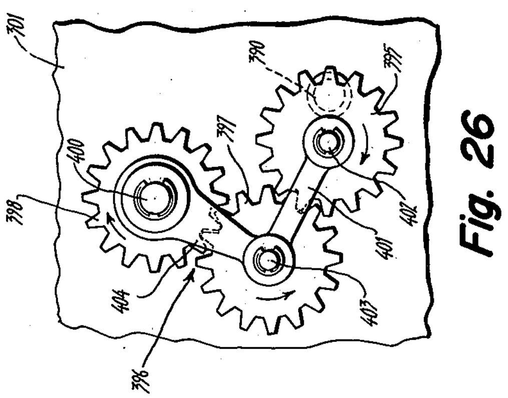
Fig. 26 is a fragmentary elevational view of the tape feed mechanism drive gearing.

The drive mechanism for the snatch roll and tape feed roll will now be described with reference to Figs. 19 and 23–25. A shaft 390 adapted to drive the tape feed roll and the punch powering snatch roll is journalled between the two mounting plates. A pulley 391 (Fig. 19) adapted to be driven by a rotary power source 392 (Fig. 23) through a belt 393 is rotatably mounted on said shaft. The end of shaft 390 extending through the rear mounting plate 301 is eccentrically secured to and a predetermined distance from the geometric axis of a first gear 395 in an epicyclic gear train 396 (Fig. 26). The teeth of gear 395 are adapted to mesh with the teeth on a planetable gear 397 which are in turn adapted to mesh with the teeth of a third gear 398. The third gear 398 is fixedly mounted on a shaft 400, whose axis is coincident with the geometric axis thereof. The shaft 400 is journalled for rotation in the front and rear mounting plates. The planetable gear 397 is maintained in meshing relationship with gear 395 through a connecting link 401 rotatably mounted on a shaft 402 which is fixedly coupled to and coincident with the geometric axis of gear 395 and on a shaft 403 which is rotatable with respect to gear 397 and whose axis is coincident with the geometric axis thereof. Gear 397 is maintained in meshing relationship with gear 398 through a link 404 which is rotatably mounted on shaft 403 and shaft 400. Shaft 400 carries a worm gear 405 (Fig. 23) which meshes with a gear 406 on a shaft 407. Another gear 408 on the opposite end of shaft 407 meshes with a gear 409 fixedly secured on the end of the sprocketed drive roll shaft 332 whereby a perforated tape is pulled past the perforating station 333.

Another gear 412 (Figs. 19 and 23) is fixedly mounted on shaft 390 adjacent the front support wall. This gear is adapted to mesh with a larger gear 413 fixedly mounted on the shaft 327 which is journalled between the support walls and as heretofore stated extends through the front support wall and carries the snatch roll 328 adapted to engage the punch driving pawls 358 selected by actuators 305. The shaft 390 also carries a clutch ratchet 415 which is secured to the pulley 391 and continuously rotatable therewith. Fixedly mounted on the shaft 390 is a clutch drive cam 416 to which a dog 417 is rotatably secured intermediate its ratchet engaging and tail ends 418 and 419 respectively. The clutch drive cam is provided with irregularly shaped openings 422 into which studs 423 and 424 mounted on ends 418 and 419 extend. The stud 423 adjacent the ratchet engaging end is resiliently secured to the cam 416 by a spring 425. The stud 424 on the tail end of the dog is adapted to be engaged by the tail 426 of the clutch control latch 325 which is pivotally mounted to the front plate as at **325*a* (Figs. 23–25) whereby the ratchet engaging end 418 of the dog 417 is biased out of engagement with the ratchet. An anti-back latch 427 is also pivoted coaxially with, and outwardly of the clutch control latch and is provided with a tail portion 428 bent into the plane of the clutch control latch. The end of the tail portion engages the stud 424 to prevent back motion of the dog. Latches 325 and 427 are biased together by a spring 429, and latch 427 is movable counterclockwise with latch 324 through a tab 430 on the tail portion of anti back latch 427 which abuts the lower edge of the clutch control latch 325**.

Figure 24:
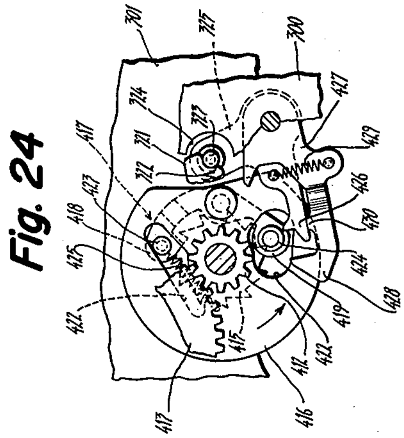
Figs. 23, 24 and 25 are fragmentary elevational views showing the principal parts and arrangement of the clutch and drive mechanisms of the invention.
Figures 23, 25:
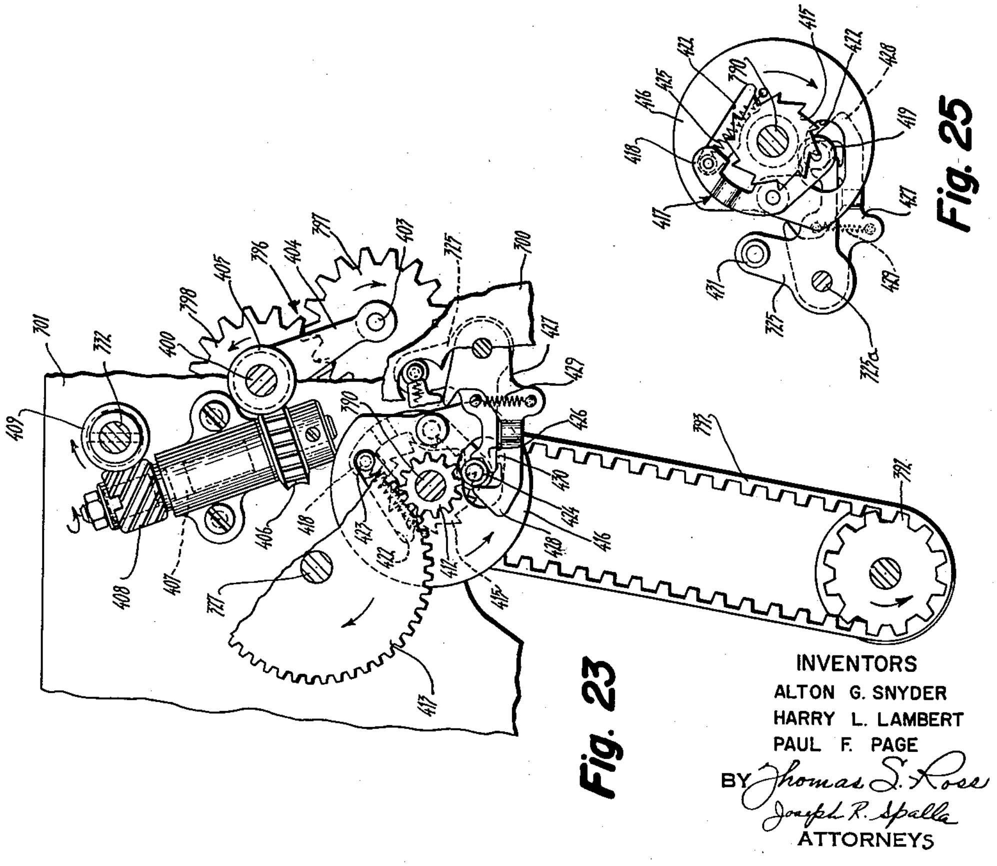

The operation of the mechanisms shown in Figs. 18–26 will now be described. The perforating and feeding mechanism are shown in a quiescent condition in Fig. 18. The snatch roll and the tape feed roll are stationary. When any one or more of the pouch actuators receive an atmospheric impulse their actuator arms 314 pull links 316 to the right and rotate associated pawl latch members 308 counterclockwise. The counterclockwise movement of the pawl latch members causes the pawl latching portions thereof to move out of the notches 365 (Fig. 22) in associated pawls thereby releasing them. The released pawls are rotated counterclockwise about their pivot shaft 344 by the springs 367 between pawls and latch members; the rotation being limited as seen in Fig. 20 by the bar 373 on the latch bail assembly. The counterclockwise rotation of the latch member 308 also rotates the clutch control bail 312 through the common bail portion 313 beneath all of the pawl latching portions 310 of the latching members. The positions of the perforating mechanisms after a pawl or pawls have been released is shown in Fig. 20. As seen in Fig. 20 the counterclockwise rotation of the clutch control bail causes the stud 323 which extends through the front plate to be pulled into the step 322 on the tail portion 320 of the clutch control bail by spring 326. Since the stud 323 is attached to the clutch control latch 325 which, as seen in Figs. 23–25, is pivoted to a shaft on the front plate, the clutch control latch rotates counterclockwise carrying with it the anti back latch 427. The counterclockwise motion of the latches 325 and 427 releases the stud 424 on the tail end of dog 417 which permits the ratchet engaging end of the dog to be pulled by spring 425 into engagement with the ratchet which is coupled to the continuously driven pulley. Since the dog is mounted on the cam secured to the shaft 390, as the cam is pulled around by the pulley driven ratchet, shaft 390 is also rotated. As shaft 390 rotates the gear 412 mounted thereon rotates the gear 413 mounted on the snatch roll shaft thereby rotating the snatch roll. As the snatch roll rotates it engages the tooth 362 of released punch driving pawls lifting the pawls and the punches attached thereto so that a tape passing through the die block is perforated (Fig. 21). As heretofore stated the interlock cam 368 mounted for rotation with the snatch roll rocks the latch bail assembly 370 whereby the universal portion 374 moves into the notches 366 of the pawls not selected to maintain them in a latched position as the selected pawls are driven through a cycle. During the interval the pawls and punches are rising the cam 416 which rotates with shaft 390 engages a stud 431 (Fig. 25) mounted on the clutch control latch on the same axis as stud 323 but on the other side thereof as seen in Fig. 25 whereby the stud 323 is returned to the latched position as shown in Figs. 18 and 21. This permits springs 317 to return actuated latch members 308 to their normal positions. As the cam and dog complete a 360° cycle the stud 424 on the dog 417 engages the surface on the tail 428 of the anti back latch camming it downwardly against the force of spring 428 so that after it passes the tail portion the spring returns the anti back latch to the normal positions shown in Fig. 23 whereupon the dog is again latched and the shaft 390 decoupled from the drive pulley.

As heretofore stated the shaft 390 is also coupled eccentrically to the first gear 395 in an eccentric gear train 396 which powers the sprocketed tape drive roll through the gear 405 mounted for rotation with the shaft 400 of the third gear in the eccentric gear train. As heretofore stated gear 405 rotates gear 406, shaft 407, gears 408 and 409 and the sprocketed tape roll drive shaft 332. Referring to Fig. 26 which shows the gear train as viewed from the rear side of the assembly, as the gear 395 rotates about its eccentric axis 390 it causes the gear 397 to rotate about its axis 403, and, due to the link connections 401 and 404 to translate about the axis 400 of gear 398. As is apparent the direction of translation will reverse each time gear 395 rotates through 180° about its eccentric axis 390, and particularly when the geometric and eccentric axes 402 and 390 are in line with the geometric axis 403 of gear 397. Because gear 397 is coupled for planetation about an eccentrically driven gear its rotary motion about its shaft 403 accelerates as the axis of shaft 403 is translating toward the fixed eccentric axis of gear 395. When the geometric axis and the eccentric axis of gear 395 are in line, with the geometric axis 402 of gear 395 at its closest point to the axis of shaft 403, the relation between the rate of translation and the rate of rotation of gear 397 about its axis 403 remains the same for a predetermined period of time thereafter or until gear 395 rotates through a predetermined arc (approx. 90°). As a result gear 397 rolls around gear 398 but does not rotate gear 398. After moving through said predetermined arc the rate of rotation of gear 397 about its shaft 403 increases until the geometric and eccentric axes of gear 395 are again in line with the geometric axis 403 of gear 397 at its farthest point from axis 402 and thereafter decreases during the interval the said axes are moving to a position of alignment 180° removed therefrom whereupon the cycle repeats. It will be seen from the above that the sprocketed tape drive roll will also be halted for the interval that gear 398 is stationary; the gear ratios being such that the stationary period occurs during the time that the punches are in the tape.

It is apparent that as the tape drive roll is driven the tape take up roll and the tape spool are also driven; the latter through friction between the flanges of the tape spool and the rubber core of the take up roll.

Referring to Fig. 22 after the snatch roll releases the teeth 362 of selected pawls it engages the return teeth 363 thereof and rotates the pawls clockwise whereby they are again latched by the pawl latching portions 310 of the pawl latch members 308.

Figure 27:
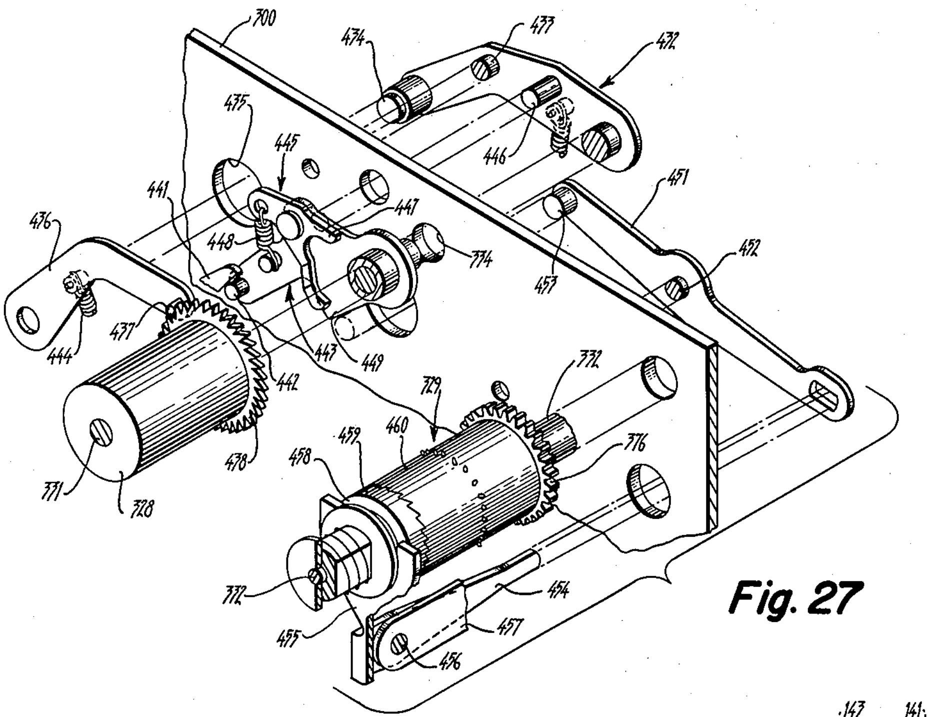
Fig. 27 is a perspective view of the back spacing mechanism of the invention.

Referring now to Fig. 18 and more particularly to Fig. 27 there is illustrated the back spacing mechanism of the invention. As heretofore stated the idler roll 328 is rotatably mounted on shaft 331 which extends through a hole 334 in the front plate which is relatively larger than shaft 331. The shaft 331 is secured to one end of a lever arm 432 which is pivotally mounted as by a stud 433 to the rear of the front plate. The other end of lever arm 432 is also provided with a stud 434 which extends through a relatively large hole 435 in the front plate 300 and which is coupled to a lever arm 436. A detent stud 437 (Fig. 27) on the free end of the lever arm 436 is adapted to ride the teeth of a ratchet wheel 438 secured to the idler roll whereby the ratchet wheel is prevented from moving more than one tooth. A bellows actuator 440 (Fig. 18) adapted to collapse when atmosphere is drawn therefrom is mounted on the front plate 300. The actuator is provided with an actuating arm 441 on its movable side adapted to cam a stud 442 secured to the tail end of a back space dog arm 443 which dog arm is rotatably mounted on the shaft 331. As seen in Fig. 18 the back space dog arm 443 and lever arm 436 are connected by a dog arm return spring 444. A back space dog 445 is rotatably mounted on the dog arm 443. A stud 446 extending through the front support wall 300 from the lever 432 abuts a tail portion 447 of the dog 445 and maintains the dog teeth in the disengaged position shown in Fig. 18 against the pull of a spring 448 connected between the dog 445 and the dog arm 443. A camming surface 449 on the dog arm is adapted to rock a lever 451 pivotally mounted as at 452 to the rear of the front plate by depressing a stud 453 mounted on the lever 451 which extends through the front plate. The other end of the lever 451 engages a lever arm 454 which lever arm is provided with a Y-shaped vertical extension 455. The lever arm 454 is pivoted as at 456 to a bracket 457 extending from the front plate whereby as said lever 451 is depressed said vertical extension 455 is moved outwardly from a vertical plane. As seen in Fig. 27 the Y-shaped extension encompasses an annular groove 458 in a clutch ratchet 459 rotatable with the sprocketed tape feed drive roll shaft 332 and keyed for axial movement along the axis of shaft 332. The ratchet 459 normally engages a complementary ratchet 460 on the feed roll 329 whereby the roll is normally coupled to the shaft. Outward movement of said extension 455 disengages said complementary ratchets thereby allowing the feed roll 329 to rotate freely around the shaft 332.

The back space mechanism operates as follows:

Upon drawing off atmosphere from the bellows actuator 440 it collapses, drawing its actuating arm 441 to the right. This action rotates the dog arm 443 and causes the camming surface 449 to ride the stud 453 and thereby raise the idler roll 328 upwardly against the rollers 353 resiliently mounted on the perforating station. Further rotation of the dog arm 443 depresses the stud 453 and rocks lever 451. This disengages the complementary ratchets 459 and 460 on the tape feed roll 329. At the same time the dog 445 rotates relative to the dog arm 443 and engages the ratchet 438 thereby rotating it one tooth; overtravel being prevented by the stud 437. The rotation of the idler roll 328 is in a direction as to pull the tape backwards through friction between the idler roll and rollers 353.

Referring now to Fig. 28 there is shown a schematic diagram of the pneumatic circuitry employed to control the tape perforating and feeding mechanisms described above. As heretofore stated with reference to Figure 1 and to Figures 12–17, output mechanisms responsive to key controlled actions actuate impulse valves 32.

Those valves actuated by valve actuating arms 128, one of which is associated with each key action with the exception of the red, black, and case shift valves are designated 475. The red, black, and case shift valves are designated 476, 477 and 478 respectively. The impulse valves 475 operated by the impulse valve actuating arms 128, associated with all the key control actions are incorporated in the encoder block with the exception of the red and black and case shift impulse valves 476, 477 and 478 respectively. The latter are not incorporated in the encoder block because it is more convenient to place them directly below the mechanisms adapted to move their actuating arms 167, 168 and 250 as is apparent from Figs. 12 and 13. As heretofore stated a punch disabling impulse valve 275 operated by arm 274 (Fig. 14) is associated with carriage return and tabulation key actions in addition to the carriage return and tabulator key action controlled ganged impulse valves 475 incorporated in the encoder block. Also as heretofore stated, one of the group of ganged impulse valves associated with the back space key action has its output (hole 151 Fig. 17) connected directly through the encoder block to the line 37′. The six output lines 35, representing binary levels 1–6 from left to right, are each connected to the control chamber of a pouch actuator 305. As is apparent the black, red and case shift impulse valves whose output represents their respective codes are connected to predetermined ones of said lines 35. For example, the red color code in the six level code is a hole in the sixth level of a tape, the black ribbon code by holes in the fifth and sixth level and the shift code by holes in levels 3–6. Hence the output lines of these valves are connected to the proper encoder output lines 35.

Two additional pouch actuators 305′ and 305″ are provided which are adapted to select a feed punch driving pawl and a rewind stop pawl which drives a punch adapted to perforate a hole in a seventh level representing the code for rewind stop. The latter two actuators are controlled by manually operated impulse valves 487 and 488 on the control panel 43. As heretofore stated with reference to Figure 1, these valves when opened deliver atmospheric pulses to the control chambers of the actuators associated therewith through line 46. An on-off valve 491, when in the "off" position shown, normally connects atmosphere to the pouch chambers of all the actuators through line 45 whereby all the actuators are disabled. When said on-off valve is turned to the "on" position line 45 is pneumatically connected with the normally sub-atmospheric output line 44 from a primary valve 493 in the pneumatic circuitry 36. Hence when the valve 491 is "on" the pouch chambers of all the actuators are at sub-atmosphere. The control chambers of all the actuators are at sub-atmosphere as are the lines 35 through connection via a bleed line 495 to a sub-atmospheric source 496. The sub-atmospheric source is connected to a first secondary valve 497, a second secondary valve 498, and to the primary valve 493 over line 499 all as described with reference to Figs. 2 and 3. The output line 500 of the first secondary valve is connected to the pouch chamber of an actuating valve 501 whose output is connected over line 502 to the input of the second secondary valve 498. The output of the second secondary valve 498 is connected over line 503 to the bellows actuator 440, adapted as heretofore explained to effect back spacing of a tape being punched. As seen on the drawing the back space control line 37′ connected to the control chamber of the actuating valve 501 is bled out through connection to the sub-atmospheric source 496 via a bleed line 505. Also provided on the control panel as heretofore stated, are a pair of ganged impulse valves 506 and 507 to which lines 47 are connected. One of the lines 47 is connected to the input of secondary 497 which is normally at sub-atmospheric and the other is connected to the input of primary valve 493 which is normally at sub-atmospheric. Also connected to the input of the primary valve is the output line 37 from the punch disabling impulse valve 275.

The operation of the pneumatic circuitry is as follows: With a vacuum pump of the system operating by a motor not shown, and the on-off valve 491 in the "on" position, all of the pneumatic valves and actuators will be conditioned for operation. Assuming a key other than the color control or case shift key, for example the A key, is depressed. Its associated actuator 117 strikes the impulse valve actuating arm 128 over the combination of holes in the encoder representing a coded A in the code illustrated hole combination 1 and 2. Atmospheric impulses entering holes 1 and 2 are channeled through the encoder block to their corresponding output lines 35 and are delivered to the control chambers of associated pouch actuators 305. These impulses cause the actuating arms 314 to move and as described with reference to Figs. 18–26 to select level 1 and 2 pawls and the tape feed or index punch pawl. Simultaneous with the selection, the clutch control bail portion 320 operates the clutch means as described with reference to Figs. 23–25 to effect coupling of a drive source to the punch powering snatch roll and to the sprocketed tape drive roll whereby a tape is punched and fed in synchronism. As is apparent the control chambers of the pouch actuators are returned to sub-atmospheric by bleeding out atmosphere through line 495 whereby they are readied for further selections. The color control and case shift impulse valve combinations whose outputs are properly connected to output lines 35 operate associated actuators in similar fashion.

If it is desired only to punch feed holes in the tape or to punch a code hole which will tell a reading mechanism to stop rewinding the tape, the rewind stop and tape feed impulse valves 487 and 488 can be manually opened to cause the selection of associated pawls and punches through associated actuating pouches 305′ and 305″.

When a carriage return or tab key is operated carriage return or tabulation code impulses as the case may be from the encoder are sent through selected lines 35 to associated pouch actuators thereby selecting the proper punches. Also through the longer line 37, to provide a slight delay, a punch disabling impulse from impulse valve 275 is delivered to the primary valve 493 whose output thereby becomes atmospheric. Atmosphere at the primary output disables the actuating pouches immediately after the carriage return code is punched and maintains them disabled as long as the carriage of the typewriter is moving as described with reference to Figs. 14 and 15.

If an error is punched into the tape the correction impulse valves are manually opened, and held open. This sends an atmospheric pulse to the first secondary valve through the line 47 associated therewith thereby reversing the normally atmospheric output thereof to sub-atmospheric. Since the output of the secondary is connected to the pouch actuator of the actuating valve 501 both the control chamber and the pouch chamber will be at sub-atmospheric pressure. The atmospheric pulse in line 47 associated with primary valve 493 reverses the primary output to atmospheric thereby disabling the pouch actuators over lines 44 and 45. Thereafter operation of the back space key sends an atmospheric pulse through line 37′; the pulses in the output lines 35 resulting from the opening of the back space impulse valve being ineffective since the pouch actuators are disabled. The pulse in line 37′ is delivered to the control chamber of the actuating valve 501 causing the selector arm of the pouch actuator half to open the impulse valve associated therewith which thereupon sends an atmospheric pulse to the input of the second secondary 498. The output of the secondary 498 will reverse to a sub-atmospheric condition thereby actuating the bellows actuator 440 which will back space the tape being punched as heretofore described through friction between the tape rollers 353 and idler roll 328. Thereafter delete codes may be punched in the tape to obliterate the error.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. A record perforating apparatus comprising in combination with means for converting motions associated with typewriter key actions into groups of pneumatic impulses representative of the function associated with a key action, of a record perforator controllable in response to said groups of impulses comprising a mounting assembly, a record perforating station mounted on said assembly, means for intermittently moving a record to be perforated columnwise past said station, a column of punches operatively mounted in said station and adapted to perforate said record, a plurality of punch driving pawls respectively coupled to said punches, a normally quiescent shaft mounted power roll, means normally latching said pawls out of engagement with said power roll, means responsive to said groups of pneumatic impulses for selectively actuating said pawl latching means thereby releasing said pawls for into engagement with said power roll, a continuously rotating power source, and clutch means operative in response to actuation of any of said pawl latching means for coupling a cycle of said power source to said power roll shaft and to said means for intermittently moving said record.

2. A record perforator as recited in claim 1 further comprising means on said pawls engageable by said power roll toward the end of its cycle for relatching said pawls, and means for resetting said pneumatically responsive means after actuation of said pawl latching means whereby successive groups of impulses are operative to initiate successive cycles of operation.

3. A pneumatically controllable record perforator adapted to perforate narrow tapes with communication sized and spaced columnar hole combinations; comprising, a plurality of communication sized and spaced punches and a feed hole punch arranged in a column and mounted for vertical movement, a pawl having a driving tooth and a restoring tooth coupled to each of said punches, a snatch roll, a latch member operatively associated with each of said pawls for holding said pawls out of engagement with said snatch roll, pneumatically operable means coupled to each of said latch members adapted when selectively operated to trip associated latch members whereby associated pawl driving teeth engage said snatch roll, a clutch control bail operative in response to the tripping of any of said latch members, said feed punch pawl latch member being tripped when any of said other latch members are tripped through said clutch control bail, and clutch means responsive to operation of said clutch control bail for coupling a motive source to said snatch roll whereby pawls in engagement with said snatch roll are driven thereby causing associated punches to perforate a tape.

4. A pneumatically controlled record perforator adapted to perforate narrow tapes in conventional communication sized and spaced codes comprising a punching station having a column of communication sized and spaced punches mounted therein, tape transport means for intermittently feeding a tape columnwise past said station, pneumatic means for selecting punches in accordance with pneumatic code impulses representative of a key function, said tape transport means comprising a sprocketed feed roll and an idler roll, shafts for rotatably mounting said idler and feed rolls, means mounting said idler roll shaft for translatory movement toward said roller means, a reverse feed ratchet mounted on said idler roll, a reverse feed pawl, manually operable correction impulse valves, back space impulse valves operable upon depression of a back space key for generating coded impulses representative of a back space function and a control impulse, pneumatic circuitry operative in response to said control impulse to disable said pneumatic means for selecting punches, and means responsive to correction impulses and said control impulse for moving said idler roll shaft toward said roller means and for moving said reverse feed pawl into driving engagement with said ratchet whereby a tape between said idler roll and said roller means will be frictionally reversely fed as said ratchet rotates.

5. Apparatus as recited in claim 4, further comprising means responsive to the translatory movement of said idler roll for disconnecting said feed roll from its drive connections, whereby said feed roll may rotate freely in a reverse direction in response to the reverse movement of the tape.

6. Apparatus for perforating binary code patterns representative of data including means for generating binary code patterns in response to business machine key depressions wherein bits are represented by the presence or absence of pneumatic impulses, said apparatus comprising a perforating station having a plurality of bit punch elements operatively mounted therein, normally quiescent means for simultaneously driving punch elements selectively coupled thereto, a plurality of selector means operative in response to said pneumatic code patterns to couple predetermined punch elements to said punch driving means, a continuously running motive source, clutch means operative when actuated to couple said motive source to said punch element driving means, and means responsive to the operation of any of said selector means for actuating said clutch means substantially simultaneously with the selection of punch elements.

7. Apparatus for perforating binary code patterns including means for generating pneumatic code patterns in response to typewriter key depressions wherein bits are represented by the presence or the absence of pneumatic impulses, said apparatus comprising a perforating station having a plurality of aligned punching elements operatively mounted therein, a power roll for simultaneously driving punching elements selectively coupled thereto, a plurality of selector means operative in response to said pneumatic code patterns to couple predetermined punching elements to said power roll, means for intermittently moving a record to be perforated columnwise past said punching elements, a shaft, a continuously running motive source, clutch means operative when actuated in response to successive groups of impulses to couple said motive source to said shaft, means coupling said shaft to said power roll and to said record moving means, and means responsive to the operation of any of said selector means for actuating said clutch means.

8. Apparatus for perforating binary code patterns in a record tape including means for generating code patterns in response to typewriter key depressions wherein bits are represented by the presence or absence of pneumatic impulses, said apparatus comprising a frame, a tape feed roll rotatably supported in said frame, intermittent drive means connected to said roll, a plurality of selectively movable punch elements operatively mounted in said frame and adapted to perforate a record tape, a power roll, a plurality of selector means operable in response to pneumatic impulses in said code patterns to selectively couple said punch elements to said power roll for a cyclic tape punching operation, a cyclic common actuator for simultaneously operating said power roll and said tape feed roll drive means, and means responsive to the operation of any of said selector means for initiating a cycle of said common actuator, the phase relation between the movement of said punch elements and the movement of said feed roll being such that when said punch elements are operatively engaged with said record tape said feed roll is in the quiescent portion of its intermittent cyclic movement, and when said feed roll partakes of rotary movement said punch elements are out of operative engagement with said record tape.

9. In a record perforating apparatus including means responsive to the operation of business machine keys for generating $n$ digit binary code patterns wherein bits are represented by the presence or absence of pneumatic impulses, said apparatus comprising, a frame, a tape feed sprocket rotatably supported in said frame, drive means for intermittently rotating said sprocket, $n$ selectively movable punch elements operatively mounted in said frame and adapted to perforate a record tape, a power roll, $n$ pneumatically responsive selector means operable to couple associated punch elements to said power roll for a cyclic tape punching operation in response to said $n$ digit code patterns, a motive source, cyclically operable actuating means for simultaneously operating said power roll and said tape feed sprocket drive means, and means operable in response to operated selector means for initiating a cycle of said actuating means.

10. Apparatus for perforating binary code patterns representative of business machine key functions, said apparatus including means for generating code patterns in response to business machine key depressions wherein the bits are represented by the presence or absence of pneumatic impulses, a control impulse generator responsive to depression of a tabulate key, a perforating station having a plurality of aligned punching elements operatively mounted therein; a normally quiescent power roll for simultaneously driving punching elements selectively coupled thereto, a pneumatic actuator associated with each of said punching elements selectively operable in response to a tabulate code pattern, punching element selector means responsive to operated pneumatic actuators for coupling associated punching elements to said power roll, means for intermittently moving a record to be perforated columnwise past said punching elements, a shaft, a continuously running motive source, a clutch means operative when actuated in response to successive groups of impulses to couple a cycle of said motive source to said shaft, means coupling said shaft to said power roll and to said record moving means, means responsive to the operation of said punching element selector means for actuating said clutch means, and pneumatic means responsive to a generated control impulse for disabling said pneumatic actuators after a perforating cycle and for a time sufficient for the tabulate function to be accomplished.

11. Apparatus for perforating binary code patterns representative of business machine key functions, said apparatus including means for generating code patterns in response to business machine key depressions wherein the bits are represented by the presence or absence of pneumatic impulses, a control impulse generator responsive to depression of a carriage return key, a perforating station having a plurality of aligned punching elements operatively mounted therein; a normally quiescent power roll for simultaneously driving punching elements selectively coupled thereto, a pneumatic actuator associated with each of said punching elements selectively operable in response to a tabulate code pattern, punching element selector means responsive to operated pneumatic actuators for coupling associated punching elements to said power roll, means for intermittently moving a record to be perforated columnwise past said punching elements, a shaft, a continuously running motive source, clutch means operative when actuated in response to successive groups of impulses to couple a cycle of said motive source to said shaft, means coupling said shaft to said power roll and to said record moving means, means responsive to the operation of said punching element selector means for actuating said clutch means, and pneumatic means responsive to a generated control impulse for disabling said pneumatic actuators after a perforating cycle and for a time sufficient for the carriage return function to be accomplished.

References Cited in the file of this patent

UNITED STATES PATENTS

| | | |
|---|---|---|
| 849,453 | Ball | Apr. 9, 1907 |
| 1,490,359 | Ball | Apr. 15, 1924 |
| 1,874,512 | Hale et al. | Aug. 30, 1932 |
| 1,937,983 | Rugh | Dec. 5, 1933 |
| 2,013,574 | Miller | Sept. 3, 1935 |
| 2,561,216 | Miller | July 17, 1951 |
| 2,633,198 | Naxon | Mar. 31, 1953 |
| 2,674,362 | Haskell | Apr. 6, 1954 |
| 2,679,902 | Brewer | June 1, 1954 |
| 2,902,005 | Panissidi | Sept. 1, 1959 |